(12) United States Patent
McCormick et al.

(10) Patent No.: US 12,169,801 B2
(45) Date of Patent: *Dec. 17, 2024

(54) FLEXIBLE WORK BREAKDOWN STRUCTURE

(71) Applicant: Procore Technologies, Inc., Carpinteria, CA (US)

(72) Inventors: Connor McCormick, Santa Barbara, CA (US); Adam Wells, Santa Barbara, CA (US); Magnus Palm, Carpinteria, CA (US); Mike Le, Goleta, CA (US); James Solum, Solvang, CA (US); Danielle Sandoval, Santa Barbara, CA (US); Brian Field, Santa Barbara, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,613

(22) Filed: Jun. 16, 2023

(65) Prior Publication Data

US 2024/0028991 A1  Jan. 25, 2024

Related U.S. Application Data

(63) Continuation of application No. 17/472,963, filed on Sep. 13, 2021, now Pat. No. 11,681,961, which is a
(Continued)

(51) Int. Cl.
*G06Q 10/00* (2023.01)
*G06Q 10/0631* (2023.01)
*G06Q 50/08* (2012.01)

(52) U.S. Cl.
CPC ....... *G06Q 10/06313* (2013.01); *G06Q 50/08* (2013.01)

(58) Field of Classification Search
CPC ............. G06Q 10/06; G06Q 10/06313; G06Q 10/0631; G06Q 10/067; G06Q 10/103;
(Continued)

(56) References Cited

U.S. PATENT DOCUMENTS

2006/0053043 A1  3/2006  Clarke
2008/0275714 A1  11/2008  Martinez
(Continued)

OTHER PUBLICATIONS

"The Industry Standard for Construction Project Control and Transparency," Prolog Manager, Trimble, 2014, 4 pages.
"Setting Up Cost Code Structures," JD Edwards EnterpriseOne Applications Job Cost Implementation Guide, Release 9.2, Oracle, https://docs.oracle.com/cd/E64610_01/EOAJC/title.htm, Jan. 22, 2019, 16 pages.
(Continued)

*Primary Examiner* — William S Brockington, III
(74) *Attorney, Agent, or Firm* — Lee Sullivan Shea & Smith LLP

(57) ABSTRACT

Improved software technology and techniques for enabling creation and management of a customized work breakdown structure ("WBS") for a specific project may comprise various phases. For instance, a first phase may involve defining an organization-level WBS comprising a first set of customized, multi-dimensional WBS codes that serve as a starting point for the WBS codes to use for projects being handled by the organization, a second phase may involve defining a project-level WBS comprising a second set of customized, multi-dimensional WBS codes to use for a particular project being handled by the organization, and a third phase may involve using the defined project-level WBS to manage certain aspects of the particular project. Further, access to customize WBS variables may be regulated based on user access permissions information indicated by an organization and/or project-level WBS.

20 Claims, 16 Drawing Sheets

Related U.S. Application Data continuation of application No. 16/395,016, filed on Apr. 25, 2019, now Pat. No. 11,120,376.

(58) Field of Classification Search
CPC ............ G06Q 10/0633; G06Q 10/063; G06Q 10/06316; G06Q 50/08
See application file for complete search history.

(56) References Cited

U.S. PATENT DOCUMENTS

| | | |
|---|---|---|
| 2010/0145492 A1 | 6/2010 | Russell |
| 2013/0132148 A1 | 5/2013 | Trummer et al. |
| 2013/0290215 A1 | 10/2013 | Dasilva et al. |
| 2014/0025412 A1 | 1/2014 | Chee et al. |
| 2017/0249574 A1 | 8/2017 | Knijnik et al. |

OTHER PUBLICATIONS

Brotherton, Shelly A. et al., "Applying the Work Breakdown Structure to the Project Management Lifecycle," Paper presented at PMI® Global Congress 2008—North America, Denver, CO. Newtown Square, PA: Project Management Institute., Oct. 19, 2008, 12 pages.

Biffi, Marie-Helene, P.E.N.G., Linking the Estimate, the Schedule and the Cost Control Through a Standard WBS, 2008 AACE International Transactions, pp. TCM.02.1-TCM.02.11.

Chimni, Jasbinder Singh, "An Approach to Computer-Based Support for Work Breakdown Structure Development", Thesis Submitted to Faculty of Graduate Studies and Research, Master of Management Studies, School of Business, Carleton University, Ottawa, Ontario, Aug. 1, 1989, 270 pages.

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

FLEXIBLE WORK BREAKDOWN STRUCTURE

CROSS-REFERENCE TO RELATED APPLICATIONS

This application is a continuation of, and claims the benefit of priority under 35 U.S.C. § 120 to, U.S. application Ser. No. 17/472,963, filed on Sep. 13, 2021, and titled "Flexible Work Breakdown Structure," which is a continuation of U.S. application Ser. No. 16/395,016, filed on Apr. 25, 2019, issued as U.S. Pat. No. 11,120,376, and titled "Flexible Work Breakdown Structure," the contents of each of which are incorporated by reference herein in their entirety.

BACKGROUND

Managing a project to completion is a complex endeavor. Indeed, a highly-involved project, such as a construction project, may include various phases to move the project toward completion. For example, a construction project may include a planning phase to allocate the project's budget by providing cost estimates for the labor, equipment, and materials, which may be used to monitor and control cost expenditures during the construction project. A construction project may also include a procurement phase to hire labor (e.g., subcontractors, on-site workers) and procure equipment and materials for the project, and an execution phase to complete the project while ensuring that it is completed on time, on budget, and meets various requirements (e.g., design requirements, building codes, regulations etc.) set forth for the project, which may be difficult to accomplish without a particular methodology that breaks down work that needs to be carried out on the project into more manageable components.

Accordingly, having an effective and efficient project management system in place is important for any organization trying to manage a complex project such as a construction project.

OVERVIEW

One methodology used for breaking down work to be carried out on a project into smaller, manageable components is known as a Work Breakdown Structure ("WBS"). In general, a WBS may define the universe of possible components into which a project can be broken down. A WBS may take various forms depending on the organization and/or the type of project involved.

Typically, a WBS includes a single dimension (which may be referred to herein as a "WBS variable") that breaks down work on a project into smaller components, and these components may be organized in either a hierarchical or non-hierarchical manner. Some WBSs may include multiple, separate dimensions that can each break down the work on a project into smaller components.

Broadly speaking, a WBS can be applied to a project in order to manage certain aspects of the project, such as the project's budget, actual expenditures, and/or work progress. For example, a WBS can be applied to a specific project that may involve assigning budget amounts to different components of a WBS variable, and these components may be used to track actual expenditures as the project progresses and compare the actual expenditures to the budget amounts to ensure that the project is progressing on budget.

More recently, software applications have been developed that allow users to apply a WBS to a project via a communication network such as the Internet, where such software applications typically comprise front-end software running on the users' client stations and back-end software running on one or more servers that are accessible to the client stations via the communication network. One such software application is the software as a service ("SaaS") platform developed by Procore Technologies, Inc that enables users to apply a WBS that includes multiple, separate WBS variables (e.g., cost code and cost type), where a respective WBS variable can break down work on a project into smaller components that can be organized in either a hierarchical or non-hierarchical manner.

However, while software applications currently exist that enable users to apply a WBS to a project, these existing software applications still have several limitations. First, existing software applications provide a predefined WBS that includes predefined WBS variables with predefined components that cannot be customized for a specific organization, a department within an organization, or a project within an organization. In this respect, existing software applications limit the granularity in which work can be broken down within an organization, such that different departments within an organization must apply the same predefined WBS, and thus provides an inflexible solution that cannot be tailored for a user with particular needs.

Second, existing software applications that allow users to apply a WBS to a project typically only allow work on a project to be broken down with respect to a single WBS variable. Thus, even when a WBS includes multiple WBS variables, a user may only be able to visualize work that is broken down into smaller components with respect to one WBS variable at a time, which is not the most effective way to visualize work.

To address these and other problems with existing software applications, disclosed herein is an improved software application that enables users to create and manage a customized WBS that can be applied to a specific project and visualize work that is broken down into smaller components with respect to multiple WBS variables at a time. In this respect, the disclosed software application provides a flexible solution that allows users to manage projects in a more effective manner.

At a high level, the disclosed software application may enable an organization (e.g., a construction management company) to create a new WBS and then apply that new WBS to a given project being handled by the organization in order to help facilitate management of the given project. In this respect, the WBS created by the organization may comprise a set of customized, multi-dimensional "WBS codes" that can be used to categorize work to be performed on a project, where these WBS codes follow a particular format defined by the organization (referred to herein as a "WBS code template" or simply just a "template") that comprises a particular sequence of two or more different WBS variables concatenated together in a particular manner.

The processes disclosed herein may involve three primary phases: (1) a first phase that involves defining an organization-level WBS comprising a first set of customized, multi-dimensional WBS codes that serve as a starting point for the WBS codes to use for projects being handled by the organization, (2) a second phase that involves defining a project-level WBS comprising a second set of customized, multi-dimensional WBS codes to use for a particular project being handled by the organization, and (3) a third phase that involves using the defined project-level WBS to manage certain aspects of the particular project, such as budgeting for the particular project. Each of these phases—which may take various forms and be carried out in various manners—are described in further detail below.

Accordingly, in one aspect, disclosed herein is a method that involves (1) causing, by a computing system, a first client station associated with a first user to present a first interface for defining an organization-level WBS that comprises a first set of WBS codes for use in breaking down work, (2) receiving, from the first client station, data defining the organization-level WBS that includes (a) data defining an organization-level template for the first set of WBS codes that specifies a given sequence of two or more WBS variables that are concatenated together and (b) data defining a respective, organization-level set of possible values for each of the two or more WBS variables specified in the organization-level template, (3) causing a second client station associated with a second user to present a second interface for defining a project-level WBS that comprises a second set of WBS codes for use in breaking down work on a given project, wherein the second interface uses the data defining the organization-level WBS to initially define (a) a project-level template for the second set of WBS codes that specifies a given sequence of two or more WBS variables that are concatenated together and (b) a respective, project-level set of possible values for each of the two or more WBS variables specified in the project-level template, (4) receiving, from the second client station, data defining one or more modifications to the project-level WBS for the given project, wherein the one or more modifications comprise at least one of (a) a modification to the project-level template or (b) a modification to a respective project-level set of possible values for a WBS variable specified in the project-level template, and (5) causing a third client station associated with a third user to present one or more third interfaces that enable the third user to use the second set of WBS codes to manage the particular project.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable storage medium provisioned with software that is executable to cause a computing system to carry out the functions disclosed herein, including but not limited to the functions of the foregoing method.

One of ordinary skill in the art will appreciate these as well as numerous other aspects in reading the following disclosure.

DETAILED DESCRIPTION

Figure 1:
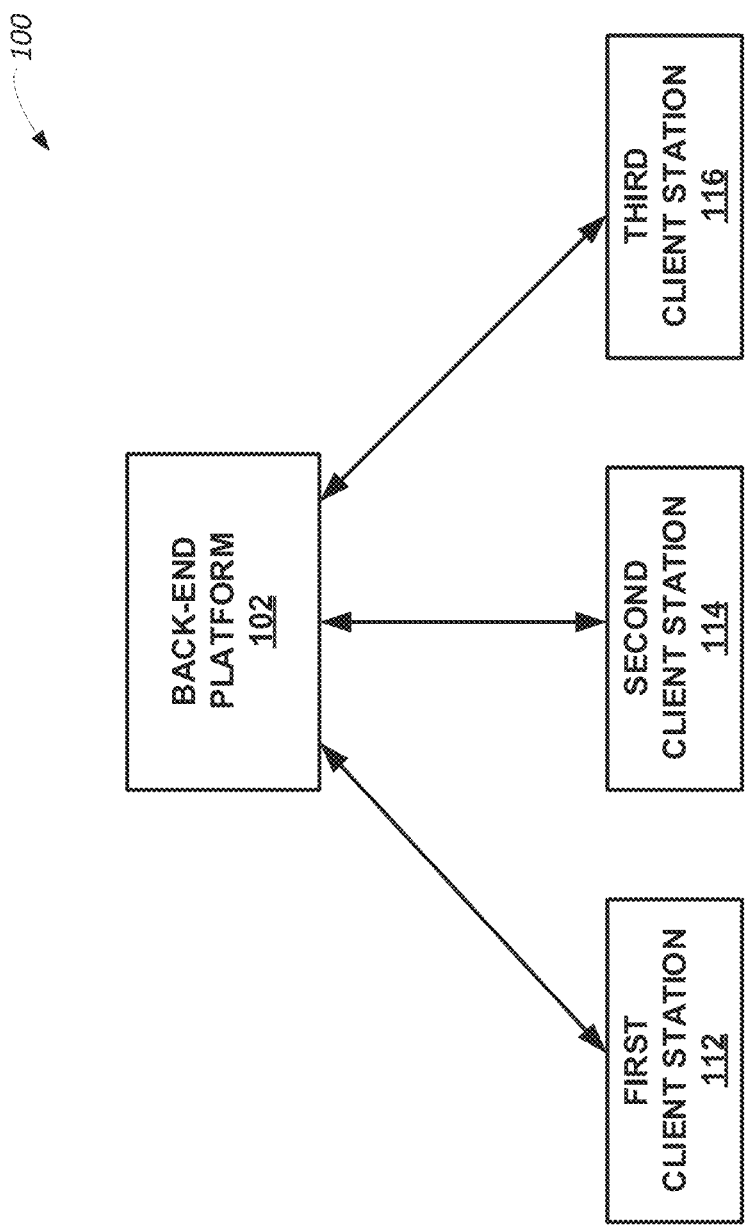
FIG. 1 depicts an example network configuration in which example embodiments may be implemented.

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE SYSTEM CONFIGURATION

As described above, the present disclosure is generally directed to an improved software application that enables users to create and manage a customized WBS that can be applied to a given project such that the given project can be managed in a more effective manner. For instance, the disclosed software application may enable construction professionals to create a customized WBS for a construction project and visualize work that is broken down into smaller components in multiple dimensions, which may facilitate management of the given project in a more efficient and convenient manner.

At a high level, the disclosed software application may comprise front-end software running on client stations of individuals involved in creating a customized WBS and then applying the WBS to a given project to facilitate management of that project, and back-end software running on a back-end platform (sometimes referred to as a "cloud" platform) that interacts with and/or drives the front-end software, which may be operated (either directly or indirectly) by the provider of the software. In this respect, the front-end software may take the form of a native application, a web application, and/or a hybrid application, among other possibilities. However, the software technology disclosed herein may take other forms as well.

While running on a user's client station, the front-end of the disclosed software application may provide a user interface through which the user may interact with the software application via visual elements, control elements, or the like. Further, the front-end of the disclosed software application may be comprised of one or more discrete software modules, where each respective software module defines a respective "view" of the user interface through which the user may interact with the software application.

In practice, a given view of the user interface provided by the front-end of the disclosed software application may include one or more "windows," which may display information and/or present control elements within a certain area of the view. A window can take various forms, and in particular, a window can be manipulated by a user to take various forms. For instance, a user may manipulate a window by hiding (i.e., minimizing or closing) the window, adjusting the window to a different size, and/or moving the window to a different area within a view (e.g., place it next to another window, place it in front of or behind another window, etc.). A window can be manipulated to take various other forms as well.

Further, in practice, a given view of the user interface provided by the front-end of the disclosed software application may include a "menu" that allows a user to select an option to execute a given command (e.g., a command to navigate to another software module of the disclosed software application's front-end). Such a menu may take various forms. As one possibility, a menu may take the form of a "menu bar" that is displayed horizontally across the top of a view and/or along the top of one of more windows within a view. As another possibility, a menu may take the form of a "pull-down menu" that includes a list of options to execute a given command. As yet another possibility, the menu may take the form of a menu bar that includes a pull-down menu, among other control elements, such as one or more filters and/or individual icons that can be selected by an individual to execute a given command. The menu may take various other forms as well.

The user interface of the disclosed software application's front-end may take various other forms as well.

Turning now to the figures, FIG. 1 depicts an example network configuration 100 in which example embodiments of the present disclosure may be implemented. As shown in FIG. 1, network configuration 100 includes a back-end platform 102 that may be communicatively coupled to one or more client stations, depicted here, for the sake of discussion, as three client stations 112, 114, and 116.

In general, back-end platform 102 may comprise one or more computing systems that have been provisioned with software for carrying out one or more of the platform functions disclosed herein, including but not limited to functions related to the disclosed process of creating a customized WBS and then applying the WBS to a given project to facilitate management of that project. The one or more computing systems of back-end platform 102 may take various forms and be arranged in various manners.

For instance, as one possibility, back-end platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates back-end platform 102 may either supply its own cloud infrastructure or may obtain the cloud infrastructure from a third-party provider of "on demand" computing resources, such include Amazon Web Services (AWS) or the like. As another possibility, back-end platform 102 may comprise one or more dedicated servers that have been provisioned with software for carrying out one or more of the platform functions disclosed herein. Other implementations of back-end platform 102 are possible as well.

In turn, client stations 112, 114, 116 may take any of various forms, examples of which may include a desktop computer, a laptop, a netbook, a tablet, a smartphone, and/or a personal digital assistant (PDA), among other possibilities.

As further depicted in FIG. 1, back-end platform 102 is configured to interact with one or more client stations 112, 114, 116 over respective communication paths. Each communication path between back-end platform 102 and one of client stations 112, 114, 116 may generally comprise one or more communication networks and/or communications links, which may take any of various forms. For instance, each respective communication path with back-end platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end platform 102 may be wireless, wired, or some combination thereof, and may carry data according to any of various different communication protocols. Although not shown, the respective communication paths with back-end platform 102 may also include one or more intermediate systems. For example, it is possible that back-end platform 102 may communicate with a given client station 112, 114, 116 via one or more intermediary systems, such as a host server (not shown). Many other configurations are also possible.

Although not shown in FIG. 1, back-end platform 102 may also be configured to receive data from one or more external data sources that may be used to facilitate functions related to the disclosed process of creating a customized WBS and then applying the WBS to a given project to facilitate management of that project. A given external data source—and the data output by such data sources—may take various forms.

As one example, a given external data source may comprise a database that stores user account information for potential users of the disclosed software application, which may include a potential user's credentials to access different modules of the software application, and back-end platform 102 may be configured to obtain user account information for a potential user from the given data source. As another example, a given external data source may comprise a database that stores data related projects associated with an organization, and back-end platform 102 may be configured to receive such data and cause a client station to present such data. A given external data source may take various other forms as well.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
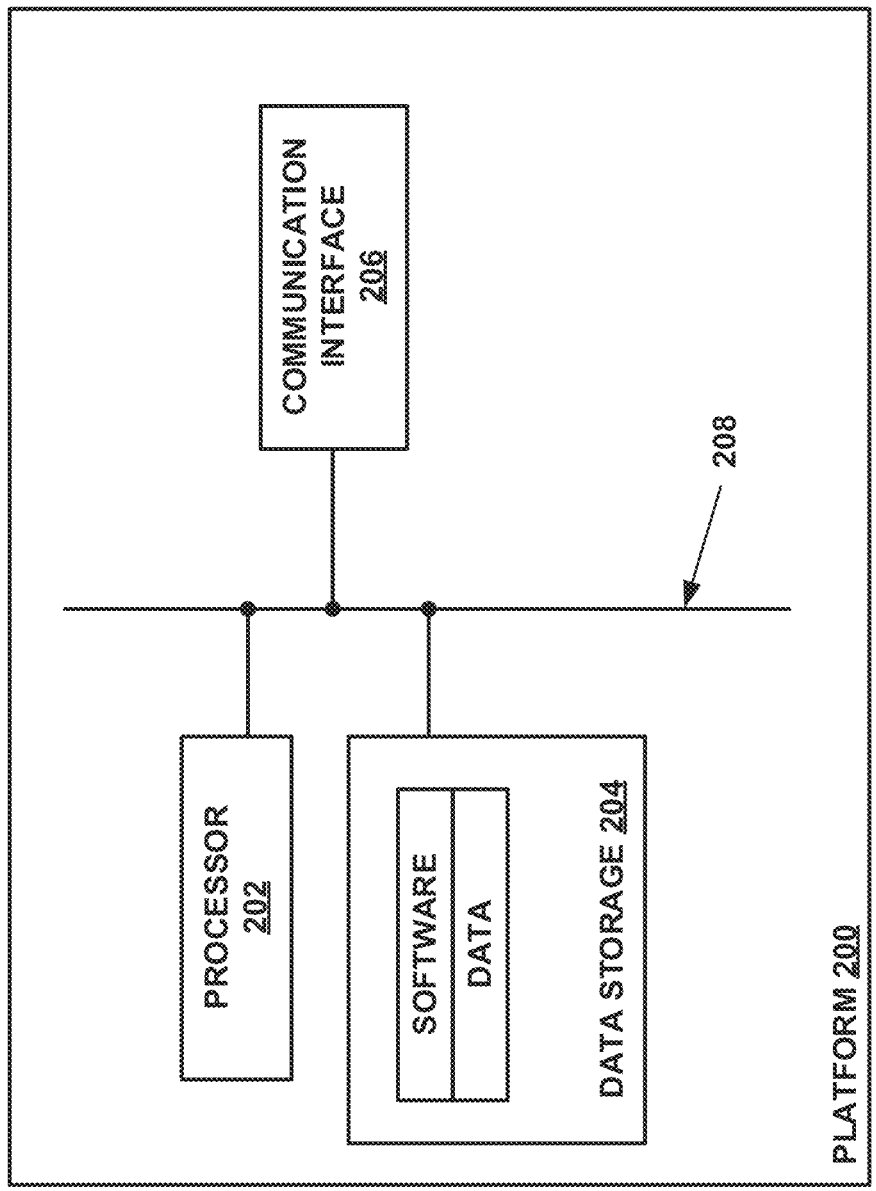
FIG. 2 depicts an example computing platform that may be configured to carry out one or more of the functions of the present disclosure.

FIG. 2 is a simplified block diagram illustrating some structural components that may be included in an example computing platform 200, which could serve as back-end platform 102 of FIG. 1. In line with the discussion above, platform 200 may generally comprise one or more computer systems (e.g., one or more servers), and these one or more computer systems may collectively include at least a processor 202, data storage 204, and a communication interface

206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the platform 200 to carry out the platform-side functions disclosed herein. These software components may generally take the form of program instructions that are executable by the processor 202 to carry out the disclosed functions, which may be arranged together into software applications, virtual machines, software development kits, toolsets, or the like. Further, data storage 204 may be arranged to store data in one or more databases, file systems, or the like. Data storage 204 may take other forms and/or store data in other manners as well.

Communication interface 206 may be configured to facilitate wireless and/or wired communication with external data sources and/or client stations, such as client stations 112, 114, 116 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE OPERATIONS

As described above, the present disclosure is generally directed to an improved software application that enables users to create and manage a customized WBS that can be applied to a given project such that the given project can be managed in a more effective manner.

At a high level, the disclosed software application may enable an organization (e.g., a construction management company) to create a new WBS and then apply that new WBS to a given project being handled by the organization in order to help facilitate management of the given project. In this respect, the WBS created by the organization may comprise a set of customized, multi-dimensional "WBS codes" that can be used to categorize work to be performed on a project, where these WBS codes follow a particular format defined by the organization (referred to herein as a "WBS code template" or simply just a "template") that comprises a particular sequence of two or more different WBS variables concatenated together in a particular manner. Such a template may take any of various forms.

For instance, each WBS variable included in a WBS code template may be representative of one particular dimension that can be used to break down work on a project, where that dimension could be a project phase, cost code, cost type, pay item type, revenue code, bill code, or owner billing group, as some non-limiting examples. In particular, a cost code is used to group individual project costs by the nature of their function (e.g., general requirements, site construction, electrical, mechanical, etc.), a cost type is used to classify project costs according to the nature of the costs that they represent (e.g., "L" for labor, "E" for equipment, "M" for materials, "C" for commitments, etc.), and a pay item type is used to classify work in terms of revenue, such that a combination of these WBS variables in a WBS code template may allow users to breakdown and visualize work with respect to both cost and revenue.

Further, the two or more WBS variables in a WBS code template may be sequenced in any of various orders and may be concatenated together in any of various manners. For instance, as one possibility, the two or more WBS variables in a WBS code template may be concatenated together using delimiters, which may take the form of a period, comma, dash, or slash, as some non-limiting examples.

To illustrate, one example of a WBS code template could include "cost_code" and "cost_type" WBS variables that are sequenced and concatenated into the form of "cost_code.cost_type" or "cost_type.cost_code". Or another example of a WBS code template could include "phase," "cost_code," and "cost_type" WBS variables that are sequenced and concatenated into the form of "phase.cost_code.cost_type", "phase.cost_type.cost_code", "cost_code.phase.cost_type", "cost_code.costtype.phase", "cost_type.phase.cost_code", or "cost_type. cost_code.phase." It will be appreciated that numerous other WBS code templates are possible as well, including WBS code templates that include different WBS variables or use a different type of delimiter.

One of ordinary skill in the art will appreciate that a delimiter may include more than one character (e.g., "xx") and may take various other forms as well. Further, one of ordinary skill in the art will appreciate that a WBS code template is not limited to a sequence having two or more different WBS variables and can alternatively comprise a single WBS variable, such that a user may breakdown and visualize work with respect to a single WBS variable if desired.

In practice, the disclosed process may involve three primary phases: (1) a first phase that involves defining an organization-level WBS comprising a first set of customized, multi-dimensional WBS codes that serve as a starting point for the WBS codes to use for projects being handled by the organization, (2) a second phase that involves defining a project-level WBS comprising a second set of customized, multi-dimensional WBS codes to use for a particular project being handled by the organization, and (3) a third phase that involves using the defined project-level WBS to manage certain aspects of the particular project, such as budgeting for the particular project. Each of these phases—which may take various forms and be carried out in various manners—will now be described in further detail below.

Figure 3:
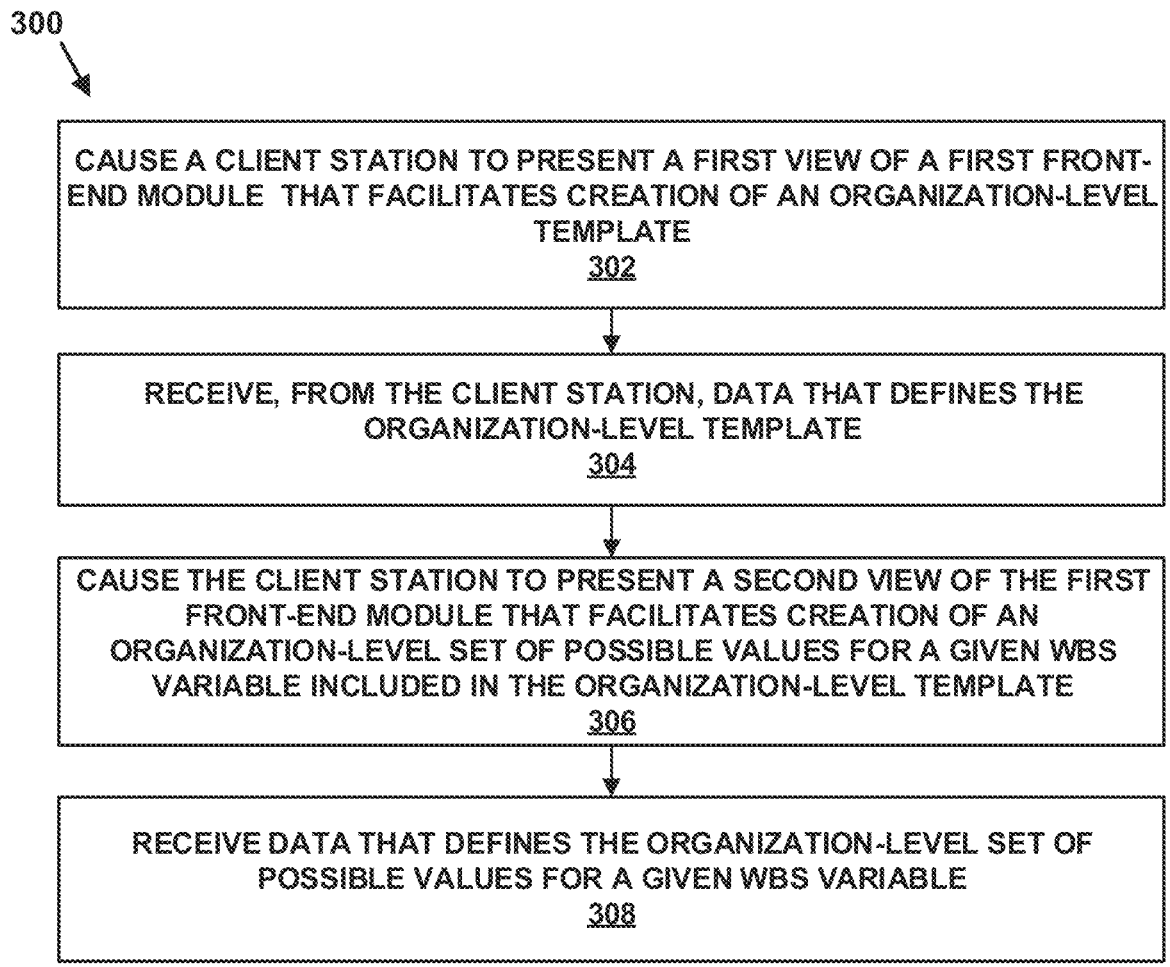
FIG. 3 depicts an example flow chart for defining an organization-level WBS.

For instance, one possible example of a first phase of the disclosed process, which may involve defining an organization-level WBS comprising a first set of customized, multi-dimensional WBS codes that serve as a starting point for the WBS codes to use for projects being handled by the organization, will now be described with reference to FIG. 3.

For the purposes of illustration only, the example functions involved in the example first phase of the disclosed process are described as being carried out by a back-end platform (e.g., back-end platform 102). However, it is possible that the responsibility for carrying out the functions of the disclosed process could be distributed between a back-end platform (e.g., back-end platform 102) and one or more client stations (e.g., client stations 112, 114, and/or 116). Further, it should be understood that the flow diagram in FIG. 3 is merely described in such manner for the sake of clarity and explanation and that some functions may be carried out in various other manners as well, including the possibility that example functions may be added, removed, rearranged into different orders, grouped together, and/or not grouped together at all.

According to an example implementation, the first phase of the disclosed process may begin with a first user having responsibility for defining an organization-level WBS for an organization (e.g., executive officer, accountant, project manager of an organization, etc.) requesting access, via the user's client station (e.g., client station 112), to a first front-end module of the disclosed software application that facilitates defining both (1) an organization-level template for WBS codes that comprises a particular sequence of two or more different WBS variables concatenated together in a particular manner and (2) for each WBS variable included in the organization-level template, a respective, organization-level set of possible values for the WBS variable.

In practice, the first user may request access to the first front-end module by, for example, launching a native application on the first user's client station or directing a web browser on the first user's client station to a uniform resource locator (URL) for the disclosed software application, either of which may cause the first user's client station to send a request to back-end platform 102 to access the first front-end module of the disclosed software application.

At block 302, in response to receiving a request from the first user's client station to access the first front-end module of the disclosed software application, back-end platform 102 may cause the user's client station to present a first view of the first front-end module of the disclosed software application that facilitates creation of an organization-level template. This first view of the first front-end module may take various forms.

Figure 4A:
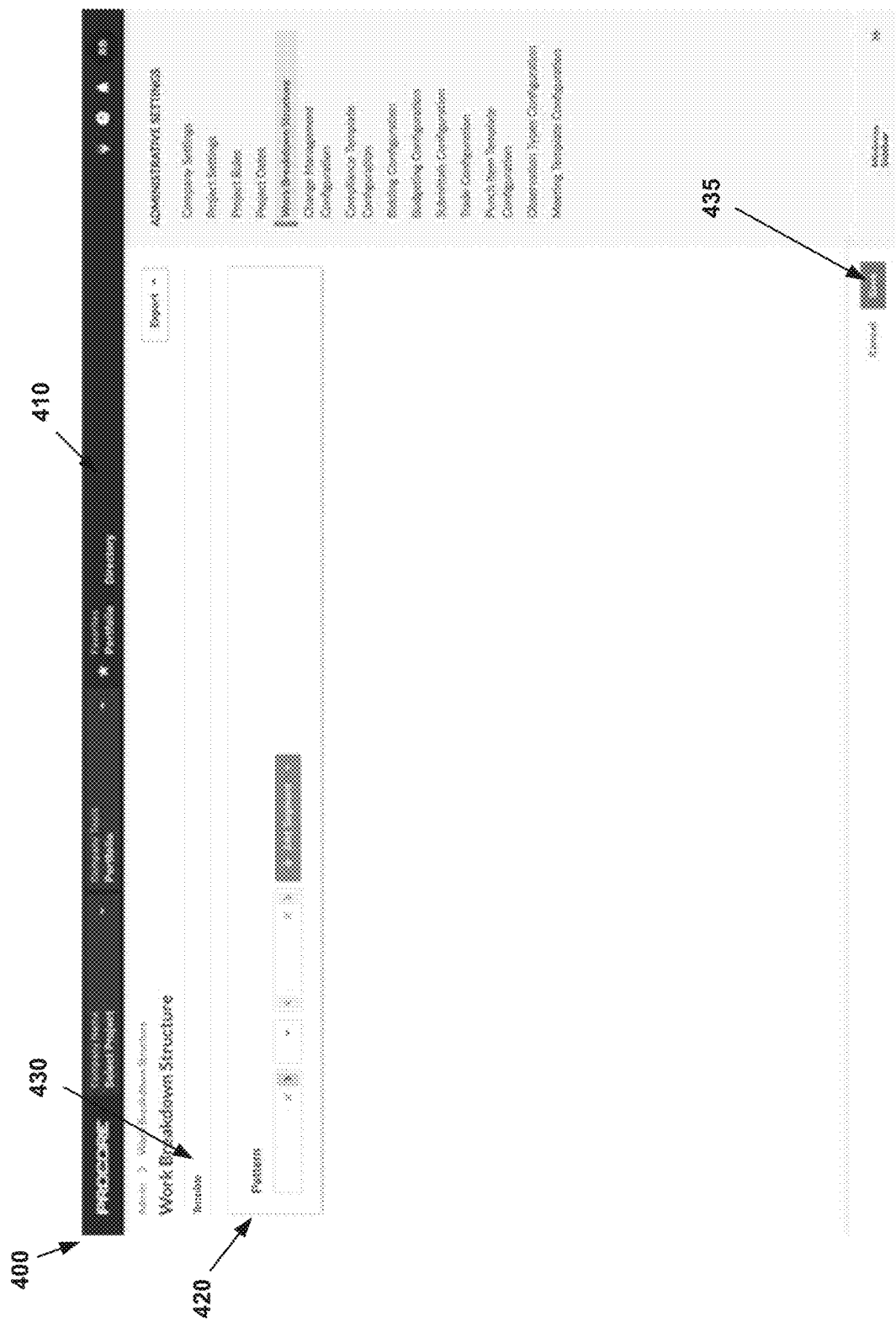
FIG. 4A depicts an example first view of a first front-end module that may be presented to a client station.

As one example to illustrate, FIG. 4A depicts an example view 400 that may be defined by the first front-end module of the disclosed software application and presented by the first user's client station. As shown, the first user may interact with view 400 in order to provide input that is used to define an organization-level template for WBS codes. One of ordinary skill in the art will appreciate that the view presented to the first user in order to define an organization-level template may take various other forms as well.

As shown in FIG. 4A, view 400 may include various elements, such as menu 410, template creation window 420, tab region 430, among other elements that are not numerically referenced. One of ordinary skill in the art will appreciate that view 400 may include additional elements not shown and/or more or less of the depicted elements.

In general, menu 410 may enable the user to navigate to a different front-end module of the disclosed software application. Menu 410 may take various forms. As one possibility, as shown in FIG. 4A, menu 410 may take the form of a menu bar that is displayed horizontally across the top of view 400. As another possibility, as further shown in FIG. 4A, menu 410 may include one or more pull-down menus that may be used to request access to another front-end module of the disclosed software application (e.g., a front-end software module related to budgeting, a front-end software module related to creating a WBS that may be applied to a specific project, etc.), and/or one or more individual icons, such as a user account icon that may be selected to view a given user's account settings and/or credentials for the disclosed software application. In line with the discussion above, menu 410 may take various other forms as well.

Template creation window 420, which may enable the user to define an organization-level template for WBS codes, may also take various forms. For instance, as shown in FIG. 4A, template creation window 420 may take the form of a rectangular region that is displayed below tab region 430 and may include elements (e.g., "Add Segment" control button) that may enable the user to define the organization-level template by adding WBS variables and delimiters and concatenating them in a particular manner. Template creation window 420 may take various other forms as well.

Further, tab region 430, which may provide an indication of a view of the first front-end module that the user is accessing, may take various forms as well. For instance, as shown, tab region 430 includes a tab that is bolded to provide an indication that view 400 comprises a "Template" view of the first front-end module. When a user adds a WBS variable to the organization-level template via template creation window 420 and saves the organization-level template, back-end platform 102 may cause the user's client station to update view 400 with a view that presents a tab that corresponds to the added WBS variable in tab region 430. In this respect, the user may later access a view of the first front-end module that enables the user to define organization-level set of possible values for the added WBS variable by inputting a selection of a tab that corresponds to the added WBS variable in tab region 430. Tab region 430 may take various other forms as well.

In practice, while accessing the first view of the first front-end software module to define an organization-level template for WBS codes, the first user may input an indication that the user wishes to create some aspect of the information in the first view, such as an indication to add WBS variables and/or delimiters to the organization-level template being defined and concatenating them in a particular manner. The user may input this indication in various manners.

As one possibility, with respect to FIG. 4A, the user may input an indication to select the "Add Segment" control button in template creation window 420, which may trigger the user's client station to present a pull-down menu in template creation window 420 to select a WBS variable from a list of WBS variables, and perhaps a pull-down menu to select a delimiter that is to be included in the organizational-level template being defined. Further, in line with the discussion above, the user's client station may present a tab within tab region 430 that corresponds to the WBS variable selected from the pull-down menu, such that the user may input an indication to select the tab to access a view of the first front-end module that enables the user to define organization-level set of possible values for the selected WBS variable.

In one particular example, to create an organization-level template that takes the form of "Phase.Cost_Code.Cost_Type" that includes three WBS variables (i.e., phase, cost code, cost type) concatenated together and sequenced with a delimiter (i.e., period) between each WBS variable, the first user may select the "Add Segment" control button in template creation window 420 to add "Phase" as a WBS variable, select the "Add Segment" control button a second time to add "Cost Code" as a WBS variable and select "." as a delimiter between "Phase" and "Cost Code, and then select the "Add Segment" control button a third time to add "Cost Type" as a WBS variable and select "." as a delimiter between "Cost Code" and "Cost Type."

Figure 4B:
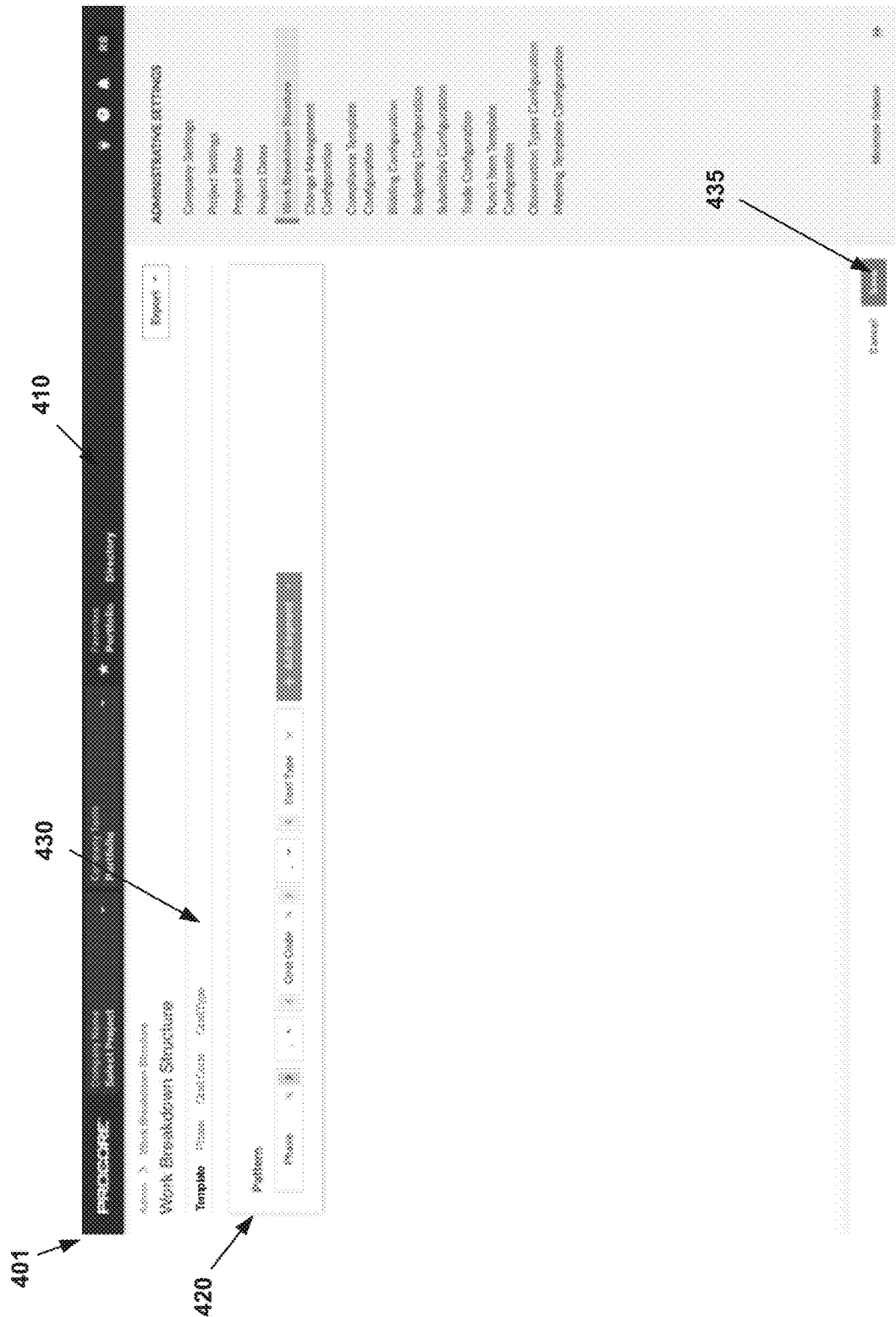
FIG. 4B depicts an example updated first view of the first front-end module.

To illustrate the particular example above, FIG. 4B depicts an updated view 401 of the first front-end module that shows how view 400 of FIG. 4A may be updated after the user creates an organization-level template that takes the form of "Phase.Cost_Code.Cost_Type" described above. As shown, view 401 may include menu 410, template creation window 420 that includes WBS variables and delimiters sequenced in a particular manner as defined for the organization-level WBS template, tab region 430 that includes tabs corresponding to each WBS variable that has been included in the organization-level WBS template, and save control button 435 that enables the user to save the organization-level template.

As further shown in FIG. 4B, the user may further define the organization-level template by adding another WBS variable (and perhaps another delimiter) using the "Add Segment" control button in template creation window 420, removing a WBS by selecting an "x" control button corresponding to a WBS variable in template creation window 420, and/or changing a WBS variable in the sequence with a different WBS variable via one of the pull-down menus in template creation window 420. The user may input an indication to define an organization-level template in template creation window 420 in various other manners as well.

As another possibility, view 400 may include a control button (not shown) to import an organization-level template that may have been created using another front-end module of the disclosed software application or a front-end module of a different software application. The imported organization-level template may be presented in template creation window 420, where each WBS variable and delimiter included in the imported organization-level template may be presented in its own respective pull-down menu such that the user may input an indication to define an organization-level template based on the imported organization-level template by adding or removing a WBS variable (or perhaps a delimiter) from the imported organization-level template using control buttons in template creation window 420 (e.g., "Add Segment" control button, "x" control button shown in FIG. 4B).

As yet another possibility, back-end platform 102 may generate suggestions for the organization-level template and cause the user's client station to present a recommended organization-level template. For instance, when the first user sends a request to back-end platform 102 to access view 400 of the first front-end module, back-end platform 102 may generate suggestions for the organization-level template and present a recommended organization-level template in template creation window 420, and the user may then input an indication to define an organization-level template based on the recommended organization-level template by adding or removing a WBS variable (or perhaps a delimiter) from the recommended organization-level template using control buttons in template region window 420 (e.g., "Add Segment" control button, "x" control button shown in FIG. 4B).

Back-end platform 102 may generate suggestions for the organization-level template based on various information. As some examples, back-end platform 102 may generate suggestions for the organization-level template based on an analysis of WBS variables that are being used across an entire organization and/or WBS variables that are being used by other organizations of similar size, structure, industry, and expertise. In this respect, the recommended organization-level template may represent a standard organization-level template used for a given type of organization. Back-end platform 102 may generate suggestions for the organization-level template based on various other information as well.

Further, a user may input an indication to define an organization-level template in various other manners as well.

At block 304, back-end platform 102 may receive data that defines the organization-level template. For instance, after the first user inputs one or more indications to define an organization-level template via the first view of the first front-end software module, the user's client station (e.g., client station 112) may send an indication of the user's input to back-end platform 102, and back-end platform 102 may receive this data. Back-end platform 102 may receive this data at various times.

For example, while accessing the first view of the first front-end module to define an organization-level template, the first user may input an indication to "save" the organization-level template, which may be accomplished by selecting save control button 435 in updated view 401, and back-end platform 102 may receive data that defines the organization-level template each time the user inputs such an indication. One of ordinary skill in the art will appreciate that while the first user accesses the first view of the first front-end module to define an organization-level template, the user's client station (e.g., client station 112) and back-end platform 102 may communicate at various other times as well, such as each time the first user inputs an indication to select the "Add Segment" control button, or each time the first user makes a selection from a pull-down menu in template creation region 420, as some non-limiting examples.

After back-end platform 102 receives data that defines the organization-level template, back-end platform 102 may take one or more actions based on the received data. For example, back-end platform 102 may store the organization-level template in a database (e.g., a database stored in data storage 204, or a database from an external data source). As another example, in line with the discussion above, back-end platform 102 may cause the first view of the first front-end module to update such that tab region 430 includes a tab for each respective WBS variable included in the organization-level template. As yet another example, back-end platform 102 may generate an alert to notify another user that an organization-level template has been created. Back-end platform 102 may take one or more other actions as well.

In turn, the first user may request access to a second view of the first front-end software module that facilitates creation of an organization-level set of possible values for a given WBS variable included in the organization-level template. For instance, with respect to FIG. 4B, the user may access a view of the first front-end module that enables the user to define organization-level set of possible values for the "Cost Code" WBS variable that has been included in the organization-level template defined in template creation window 420 by inputting a selection of a tab that corresponds to the "Cost Code" WBS variable in tab region 430. In this respect, the organization-level set of possible values for each WBS variable included in the organization-level template may be defined by accessing a respective tab corresponding to a given WBS.

At block 306, in response to receiving a request from the first user's client station to access a second view of the first front-end module of the disclosed software application, back-end platform 102 may cause the user's client station to present the second view of the first front-end module that facilitates creation of an organization-level set of possible values for a given WBS variable included in the organization-level template. The second view of the first front-end module that may be presented to the client station may take various forms.

Figure 5A:
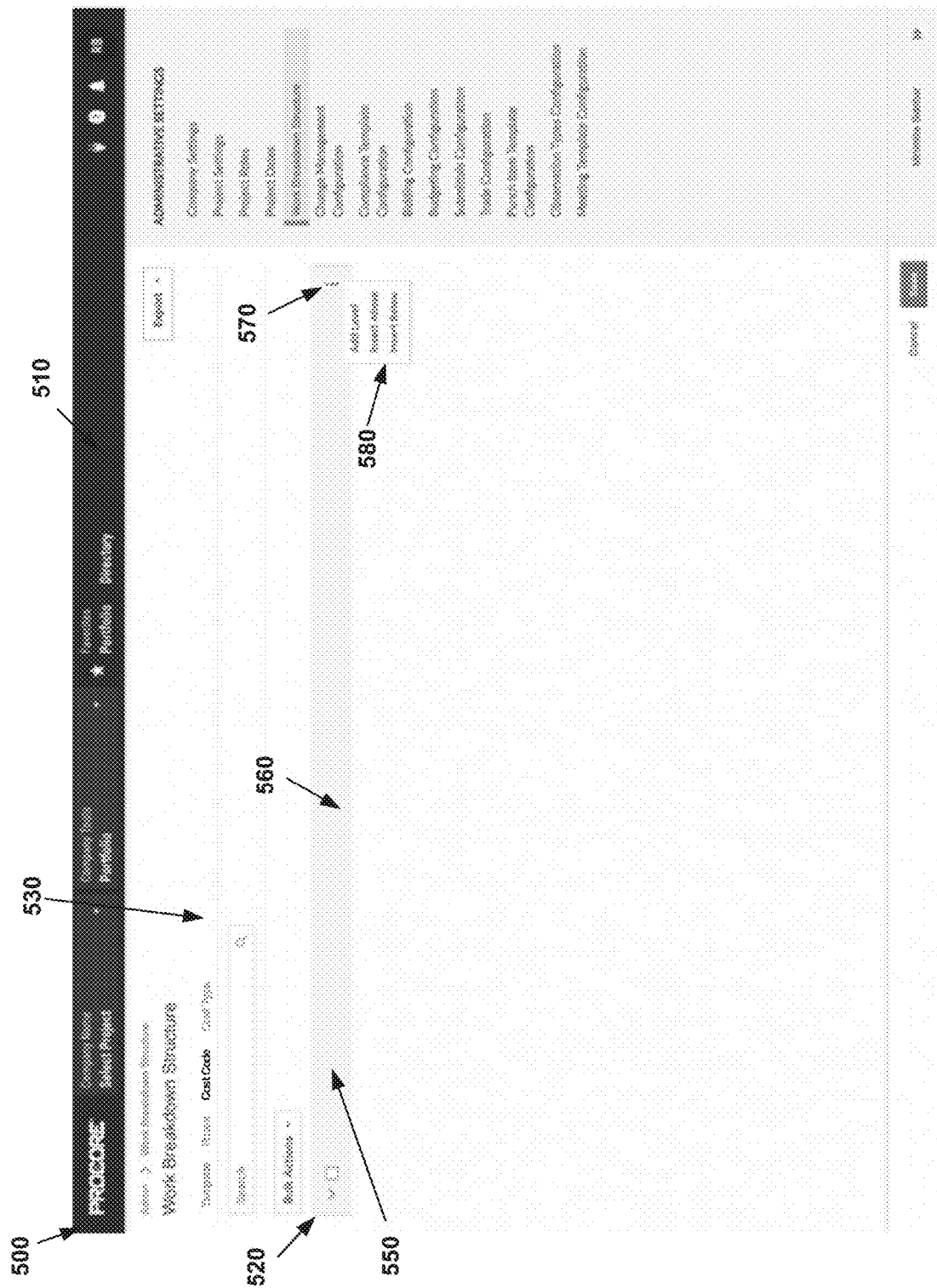
FIG. 5A depicts an example second view of a first front-end module that may be presented to a client station.

As one example to illustrate, FIG. 5A depicts an example view 500 that facilitates creation of an organization-level set of possible values for the "Cost Code" WBS variable included in the organization-level template, which may be accessed after the first user inputs a selection of a tab that corresponds to the "Cost Code" WBS variable in tab region 430 of FIG. 4B. As shown, the tab that corresponds to the "Cost Code" WBS variable is bolded to provide an indication that view 500 of the first front-end module is being accessed to facilitate the creation of an organization-level set of possible values for the "Cost Code" WBS variable. One of ordinary skill in the art will appreciate that view 500 may be accessed in various other manners as well.

As further shown in FIG. 5A, view 500 may include various elements, such as menu 510, value creation window 520, tab region 530, input regions 550 and 560, and control button 570, among other elements that are not numerically referenced. One of ordinary skill in the art will appreciate that view 500 may include additional elements not shown and/or more or less of the depicted elements.

In general, menu 510 and tab region 530 may take various forms similar to menu 410 and tab region 430 described above. Likewise, value creation window 520, which may enable the user to define the organization-level set of possible values for a given WBS variable (e.g., "Cost Code"), may take various forms as well. For instance, as shown in FIG. 5A, value creation window 520 may take the form of a rectangular region that is displayed below tab region 530 and may include various elements that enable the user to add the organization-level set of possible values for the "Cost Code" WBS variable included in the organization-level template. Value creation window 520 may take various other forms as well.

In practice, while accessing the second view of the first front-end software module, the user may input an indication that the user wishes to create some aspect of the information in the second view of the first front-end software module, such as an indication to define the organization-level set of possible values for a given WBS variable. The user may input this indication in various manners.

As one possibility, as shown in FIG. 5A, the user may input an indication to select input region 550 that may enable the user to add a possible value for the "Cost Code" WBS variable, input an indication to select input region 560 that may enable the user to describe the value added for the "Cost Code" WBS variable, and/or input an indication to select control button 570, which may trigger the user's client station to present window 580 in a portion of value creation window 520 and enable the user to add another possible value for the "Cost Code" WBS variable.

Figure 5B:
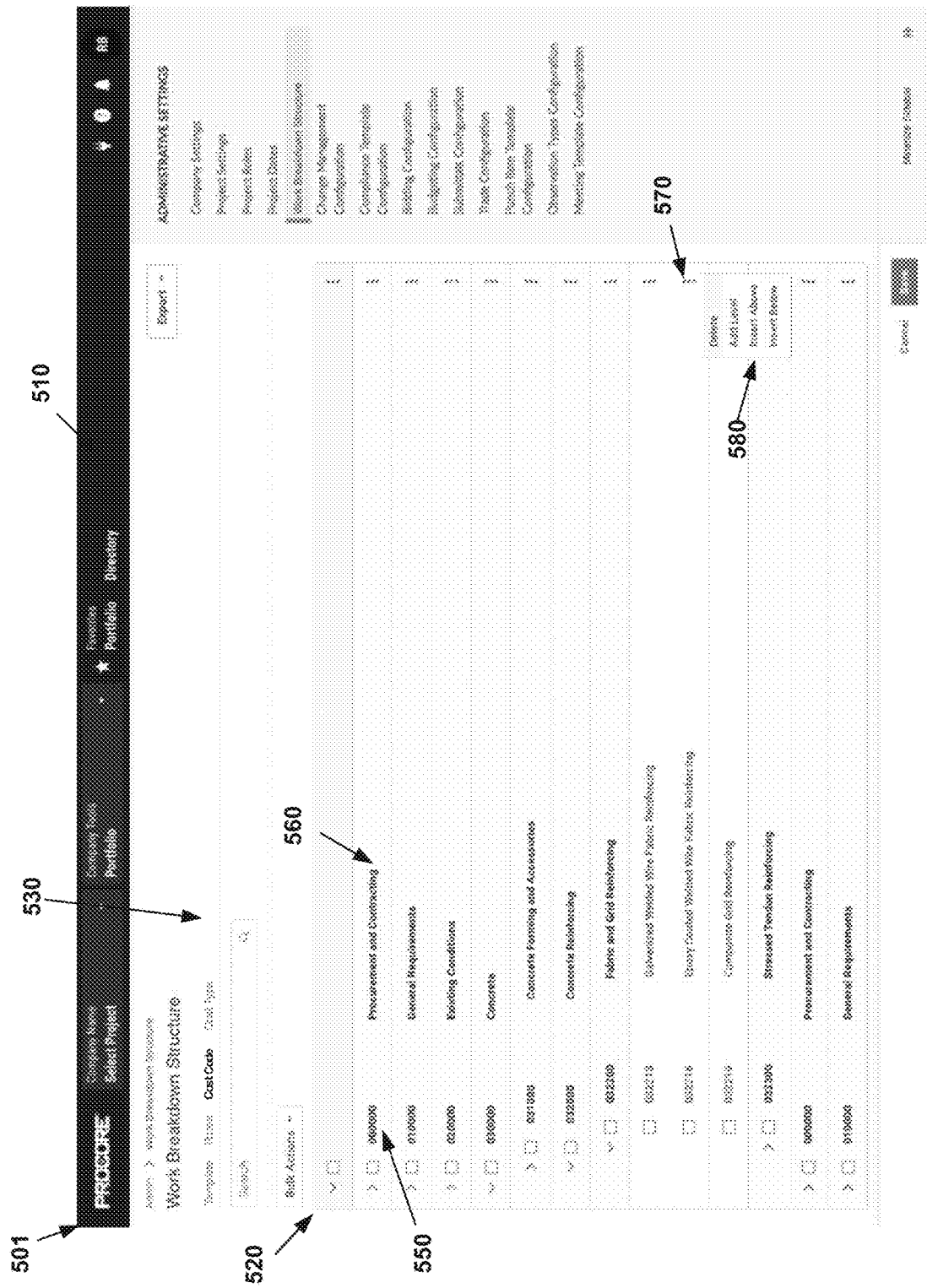
FIG. 5B depicts an example updated second view of the first front-end module.

To illustrate one particular example, FIG. 5B depicts an updated view 501 that shows how view 500 of FIG. 5A may be updated after the user inputs one or more indications in value creation window 520 to define the organization-level set of possible values for the "Cost Code" WBS variable. In general, FIG. 5B includes the organization-level set of possible values for the "Cost Code" WBS variable and a corresponding description for each possible value. For instance, input region 550 includes a possible value "000000" for the "Cost Code" WBS variable that has been input by the user, and input region 560 includes a description (i.e., "Procurement and Contracting") corresponding to the possible value "000000."

As further shown in FIG. 5B, some of the possible values in the organization-level set of possible values for the "Cost Code" WBS variable are presented in a hierarchical manner to indicate that such values are associated with another possible value that is higher in the hierarchical structure. For example, value "032200" that corresponds to "Fabric and Grid Reinforcing" may be associated with value "03220000" that corresponds to "Concrete Reinforcing," and the value "03220000" may be associated with value "0300000" that corresponds to "Concrete," which is higher in the hierarchical structure presented in value creation window 520.

The user may input an indication to define the organization-level set of possible values for a given WBS variable in various other manners as well.

As another possibility, view 500 may include a "control button (e.g., a "Bulk Actions" control button) to import the organization-level set of possible values for a given WBS variable included in an organization-level template that may have been created using another front-end module of the disclosed software application or a front-end module of a different software application. The imported organization-level set of possible values may be presented in value creation window 520, and the user may input an indication to define an organization-level set of possible values for a given WBS variable based on the imported set of possible values for the given WBS variable by using various elements in value creation window 520 described above.

As yet another possibility, back-end platform 102 may generate suggestions for the organization-level set of possible values. For instance, when the first user sends a request to back-end platform 102 to access view 500 of the first front-end module, back-end platform 102 may generate suggestions for the organization-level set of possible values corresponding to a given WBS variable included in the organization-level template and present a recommended set of possible values for the given WBS variable in value creation window 520. The user may then input an indication to define an organization-level set of possible values for the given WBS variable based on the recommended set of possible values for the given WBS variable by using various elements in value creation window 520 described above.

Back-end platform 102 may generate suggestions for the organization-level set of possible values based on various information. As some examples, back-end platform 102 may generate suggestions for the organization-level set of possible values based on an analysis of values that are being used for a given WBS variable across an entire organization and/or values that are being used for a given WBS variable by other organizations of similar size, structure, industry, and expertise. In this respect, the recommended organization-level set of possible values may represent a standard organization-level set of possible values used for a given type of organization. Back-end platform 102 may generate suggestions for the organization-level set of possible values based on various other information as well.

Further, a user may input an indication to define the organization-level set of possible values for a given WBS variable in various other manners as well.

In line with the discussion above, one of ordinary skill in the art will appreciate that the organization-level set of possible values for a given WBS variable that are created in value creation window 520 may be presented in various other manners as well, such as a list, outline, or the like, and each possible value in the set may take various other forms and may be represented in various other ways (e.g., in a non-hierarchical manner) as well.

At block 308, back-end platform 102 may receive data that defines the organization-level set of possible values for a given WBS variable. For instance, after the first user inputs one or more indications to define the organization-level set of possible values for a given WBS variable, the user's client station (e.g., client station 112) may send an indication of the user's input to back-end platform 102, and back-end platform 102 may receive this data. Back-end platform 102 may receive this data at various times.

For example, while accessing the second view of the first front-end module to define the organization-level set of possible values for a given WBS variable, the first user may input an indication to "save" the organization-level set of possible values for the given WBS variable, which may be accomplished by selecting "Save" control button in updated view 501, and back-end platform 102 may receive data that defines the organization-level set of possible values for the given WBS variable each time the user inputs such an indication.

In line with the discussion above, one of ordinary skill in the art will appreciate that while the first user accesses the second view of the first front-end module, the user's client station (e.g., client station 112) and back-end platform 102 may communicate at various other times as well, such as each time the user inputs a possible value in input region 550, or each time the user makes a selection from window 580 to add another possible value to the organization-level set of possible values, as some non-limiting examples.

After back-end platform 102 receives data that defines the organization-level set of possible values for a given WBS variable, back-end platform 102 may take one or more actions based on the received data. For example, back-end platform 102 may store the organization-level set of possible values for a given WBS variable in a database (e.g., a database stored in data storage 204, or a database from an external data source) and/or generate an alert to notify another user that the organization-level set of possible values for a given WBS variable has been defined. Back-end platform 102 may take one or more other actions as well.

Once an organization-level set of customized, multi-dimensional WBS codes has been defined, the disclosed process may transition from the first phase to the second phase, which generally involves using the organization-level WBS as a starting point for defining a project-level WBS comprising a second set of customized, multi-dimensional WBS codes to use for a particular project being handled by the organization. One possible example of a second phase of the disclosed process will now be described with reference to FIG. 6.

Figure 6:
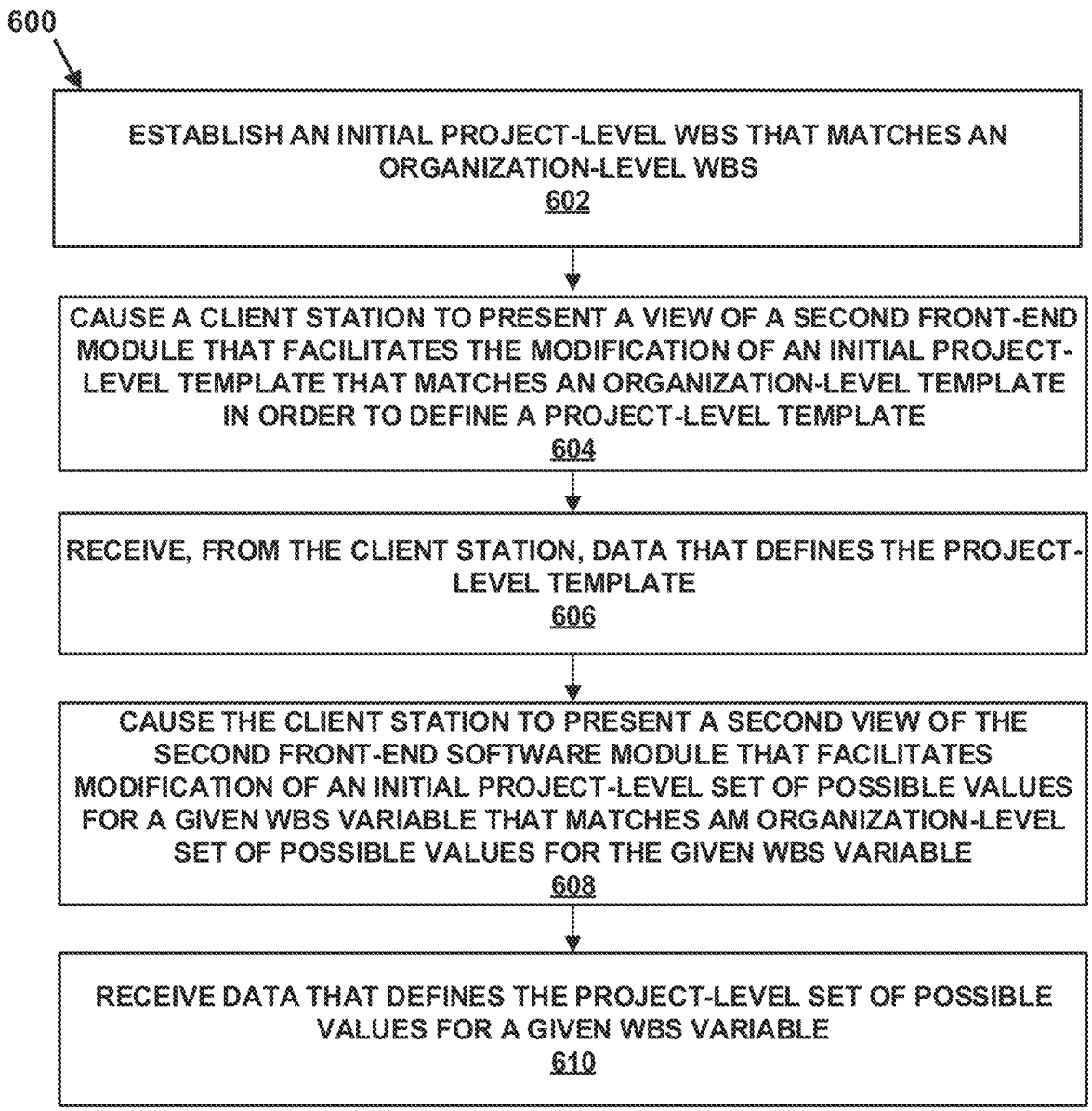
FIG. 6 depicts an example flow chart for defining a project-level WBS.

For the purposes of illustration only, the example functions involved in the example first phase of the disclosed process are described as being carried out by a back-end platform (e.g., back-end platform 102). However, it is possible that the responsibility for carrying out the functions of the disclosed process could be distributed between a back-end platform (e.g., back-end platform 102) and one or more client stations (e.g., client stations 112, 114, and/or 116). Further, it should be understood that the flow diagram in FIG. 6 is merely described in such manner for the sake of clarity and explanation and that some functions may be carried out in various other manners as well, including the possibility that example functions may be added, removed, rearranged into different orders, grouped together, and/or not grouped together at all.

According to an example implementation, the second phase of the disclosed process may begin with a second user having responsibility for defining a project-level WBS for a particular project being handled by the organization (e.g., project manager, cost account manager of an organization, etc.) requesting access, via the user's client station (e.g., client station 114), to a second front-end module of the disclosed software application that facilitates defining both (1) a project-level template for WBS codes that comprises a particular sequence of two or more different WBS variables concatenated together in a particular manner and (2) for each WBS variable included in the project-level template, a respective, project-level set of possible values for the WBS variable.

In line with the discussion above, one of ordinary skill in the art will appreciate that a project-level template for WBS codes is not limited to a sequence having two or more different WBS variables, and can alternatively comprise a single WBS variable, such that a user may breakdown and visualize work for a particular project with respect to a single WBS variable if desired.

In practice, the second user may request access to the second front-end module by launching a native application on the second user's client station or directing a web browser on the second user's client station to a uniform resource locator (URL) for the disclosed software application, either of which may cause the second user's client station to send a request to back-end platform 102 to access the second front-end module of the disclosed software application.

At block 602, in response to receiving a user's request, back-end platform 102 may establish an initial project-level WBS that matches the organization-level WBS, which includes (1) an initial project-level template that corresponds to the organization-level template, and (2) for each WBS variable included in the initial project-level template, a respective initial project-level set of possible values for the variable that corresponds to the respective organization-level set of possible values for the variable. For instance, client station 114 may send a request to back-end platform 102 to access the second front-end module of the disclosed software application, which may trigger back-end platform 102 to establish an initial project-level WBS that corresponds to the organization-level WBS. It should be understood that the WBS variables in the initial project-level template may match the values in organization-level template, they may also include only a subset of values. For example, the first user may have provisioned only certain WBS variables to a given project, or to a certain users administering the project. Accordingly, each organization-level WBS variable may have associated access control provisions.

At block 604, after establishing the initial project-level WBS, back-end platform 102 may then cause the user's client station to present a first view of the second front-end module of the disclosed software application that facilitates the modification of an initial project-level template that correspond to the organization-level template in order to define a project-level template. This first view of the second front-end module may take various forms.

Figure 7A:
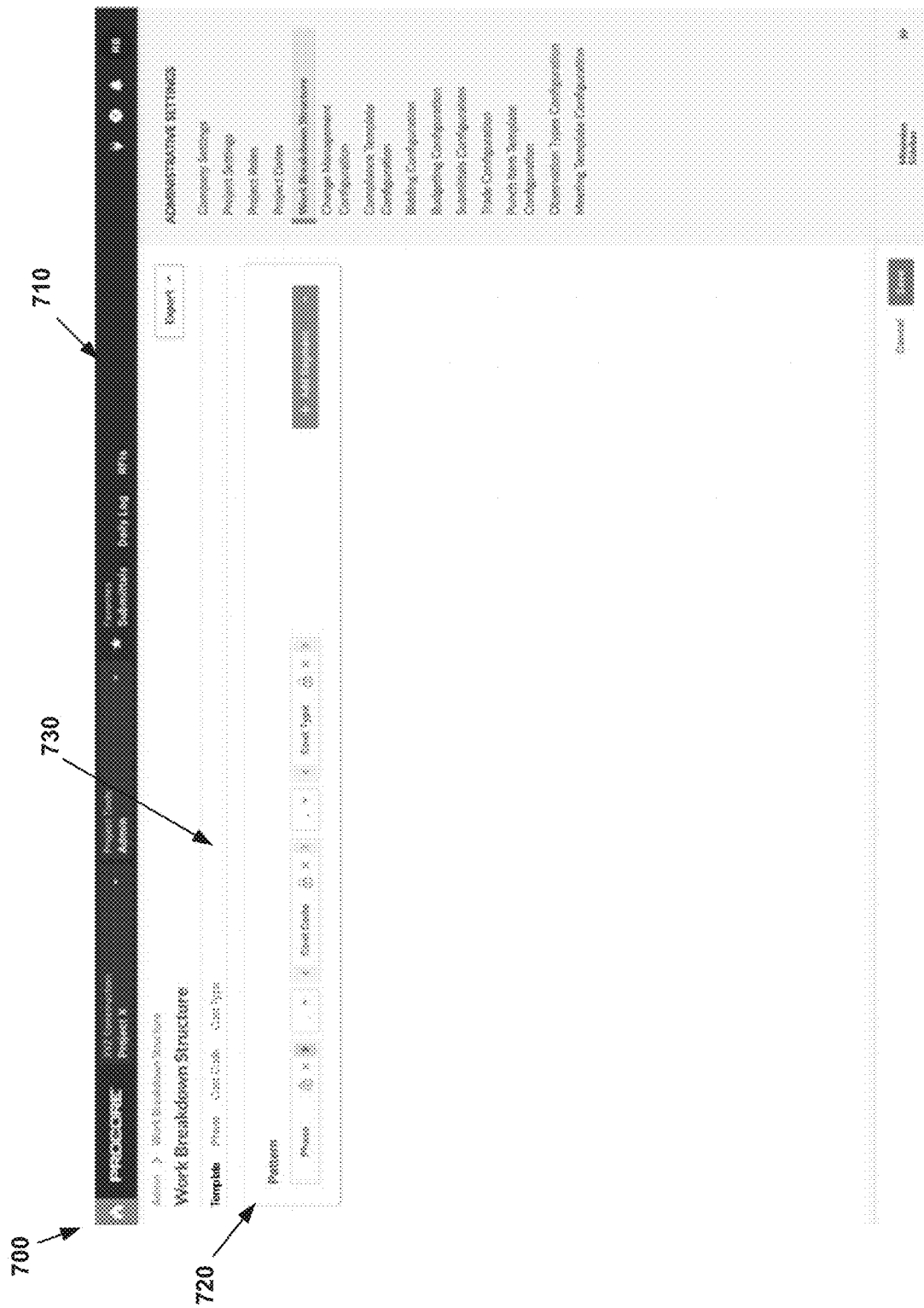
FIG. 7A depicts an example first view of a second front-end module that may be presented to a client station.

As one example to illustrate, FIG. 7A depicts an example view 700 that may be defined by the second front-end module of the disclosed software application and presented by the second user's client station. In general, the second user may interact with view 700 in order to modify the initial project-level template that corresponds to the organization-level template shown in FIG. 4B (i.e., "Phase.Cost_Code-.Cost_Type").

As shown in FIG. 7A, view 700 may include various elements, such as menu 710, template modification window 720, and tab region 730, among other elements that are not numerically referenced. One of ordinary skill in the art will appreciate that view 700 may include additional elements not shown and/or more or less of the depicted elements.

In line with the discussion above, the elements included in view 700 may take various forms similar to the forms described with respect FIG. 4A. For instance, menu 710 may take the form of a menu bar that is displayed horizontally across the top of view 700 that includes an indication that a project-level template is being created for "Project X."

Template modification window 720, which may enable the user to modify the initial project-level template, may also take various forms similar to template creation window 420 of FIG. 4A. For example, template modification window 720 may take the form of a rectangular region that is displayed below tab region 730 and may include various elements that may enable the user to modify the initial project-level template, such as by adding WBS variables and/or delimiters via the "Add Segment" control button or removing WBS variables and/or delimiters via the "x" control button in template creation window 720.

Additionally, template modification window 720 may include an indicator that provides an indication that a given WBS variable (e.g., Phase) must be included in a project-level template and cannot be modified (e.g., removed or changed to a different WBS variable) by the second user. One of ordinary skill in the art will appreciate that template modification window 720 may take various other forms as well.

Tab region 730 may take various forms as well. For instance, as shown, tab region 730 includes a tab that is bolded to provide an indication that view 700 comprises a "Template" view of the second front-end module. When a user adds (or removes) a WBS variable via template modification window 720 and saves the project-level template, back-end platform 102 may cause the user's client station to update view 700 with a view that presents a tab that corresponds to the added WBS variable (or a view that removes a tab that corresponds to the removed WBS variable) in tab region 730. In this respect, the user may later access a view of the second front-end module that enables the user to define a project-level set of possible values for a given WBS variable included in the project-level template by inputting a selection of a tab that corresponds to the given WBS variable in tab region 730. Tab region 730 may take various other forms as well.

In practice, while accessing the first view of the second front-end software module, the second user may input an indication that the user wishes to modify some aspect of the information in the first view, such as an indication to add WBS variables and/or delimiters to the initial project-level template presented in template modification window 720. The user may input this indication in various manners.

As one possibility, with respect to FIG. 7A, the user may input an indication to select the "Add Segment" control button in template modification window 720, which may trigger the user's client station to present a pull-down menu in template modification window 720 to select a WBS variable from a list of WBS variables, and perhaps a pull-down menu to select a delimiter that is to be included in the project-level template being defined. Further, in line with the discussion above, the user's client station may present a tab within tab region 730 that corresponds to the WBS variable selected from the pull-down menu, such that the user may input an indication to select the tab to access a view of the second front-end module that enables the user to define project-level set of possible values for the selected WBS variable.

In one particular example, to create a project-level template that takes the form of "Phase.Cost_Code.Cost_Type.Pay_Item" that includes four WBS variables (i.e., phase, cost code, cost type, pay item) concatenated together and sequenced with a delimiter (i.e., period) between each WBS variable, the second user may select the "Add Segment" control button in template modification window 720 to add "Pay Item" as a WBS variable to the initial project-level template that takes the form of "Phase.Cost_Code.Cost_Type."

Figure 7B:
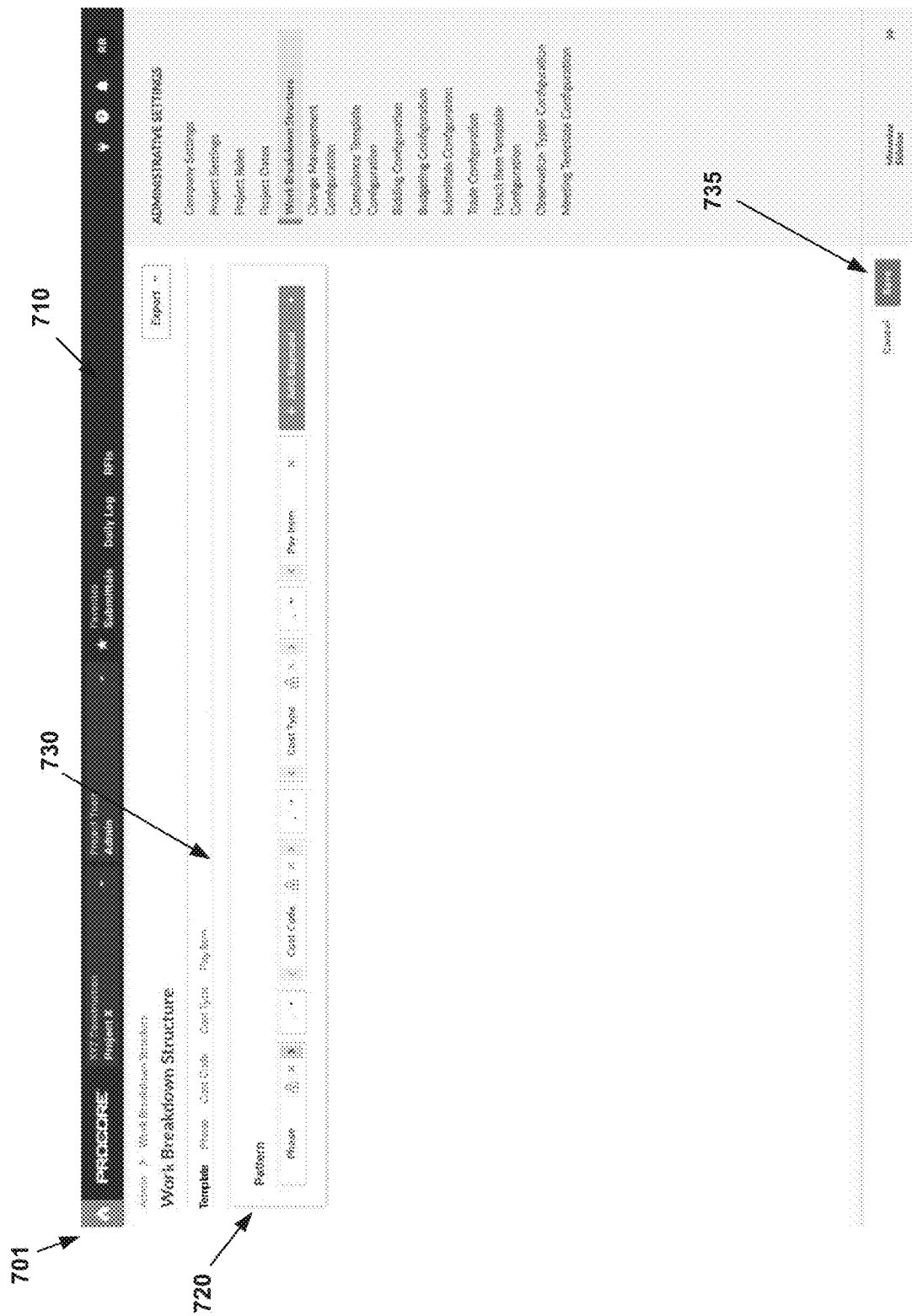
FIG. 7B depicts an example updated first view of the second front-end module.

To illustrate the particular example above, FIG. 7B depicts an updated view 701 of the second front-end module that shows how view 700 of FIG. 7A may be updated after the user modifies an initial project-level template to define a project-level template that takes the form of "Phase.Cost_Code.Cost_Type.Pay_Item." As shown, view 701 may include menu 710, template modification window 720 that includes WBS variables and delimiters sequenced in a particular manner as defined for the project-level template, tab region 730 that includes tabs corresponding to each WBS variable included in the project-level template, and save control button 735 that enables the user to save the project-level template. In line with the discussion above, these elements in view 701 may take various forms.

The user may input an indication to define a project-level template in template modification window 720 in various other manners as well.

As another possibility, view 700 may include a control button (not shown) to import a project-level template that may have been created using another front-end module of the disclosed software application or a front-end module of a different software application. The imported project-level template may be presented in template creation modification 720, where each WBS variable and delimiter included in the imported project-level template may be presented in its own respective pull-down menu such that the user may input an indication to add, remove, or change a WBS variable (or perhaps a delimiter) from the imported project-level template using control buttons in template modification window 720 (e.g., "Add Segment" control button, "x" control button shown in FIG. 7B).

As yet another possibility, back-end platform 102 may generate suggestions for the project-level template and cause the user's client station to present a recommended project-level template. For instance, when the second user sends a request to back-end platform 102 to access view 700 of the second front-end module, back-end platform 102 may generate suggestions for the project-level template and present a recommended project-level template in template modification window 720, and the user may then input an indication to add, remove, or change a WBS variable (or perhaps a delimiter) from the recommended project-level template using control buttons in template modification window 720 (e.g., "Add Segment" control button, "x" control button shown in FIG. 7B).

Back-end platform 102 may generate suggestions for the project-level template based on various information. As some examples, back-end platform 102 may generate suggestions for the project-level template based on an analysis of WBS variables used on other projects being handled by the organization and/or WBS variables used on other similar projects handled by other organizations of similar size, structure, industry, and expertise. In this respect, the recommended project-level template may represent a standard project-level template used for a given type of project. Back-end platform 102 may generate suggestions for the project-level template based on various other information as well.

Further, a user may input an indication to define a project-level template in various other manners as well.

At block 606, back-end platform 102 may receive data that defines the project-level template. For instance, after the second user inputs one or more indications to modify the initial project-level template via the first view of the second front-end software module, the user's client station (e.g., client station 114) may send an indication of the user's input to back-end platform 102, and back-end platform 102 may receive this data. Back-end platform 102 may receive this data at various times similar to the times described above with respect to block 304 of FIG. 3.

After back-end platform 102 receives data that defines the project-level template, back-end platform 102 may take one or more actions based on the received data. For example, back-end platform 102 may store the project-level template in a database (e.g., a database stored in data storage 204, or a database from an external data source), cause the first view of the second front-end module to update such that tab region 730 includes a tab for each respective WBS variable included in the project-level template, and/or generate an alert to notify another user that a project-level template has been defined. Back-end platform 102 may take one or more other actions as well.

In turn, the second user may request access to a second view of the second front-end software module that facilitates creation of a project-level set of possible values for a given WBS variable included in the project-level template. For instance, with respect to FIG. 7B, the user may access a view of the second front-end module that enables the user to define project-level set of possible values for the "Cost Code" WBS variable that has been included in the project-level template defined in template modification window 720 by inputting a selection of a tab that corresponds to the "Cost Code" WBS variable in tab region 730.

At block 608, in response to receiving a request from the second user's client station to access a second view of the second front-end module of the disclosed software application, back-end platform 102 may cause the user's client station to present the second view of the second front-end module that facilitates the modification of an initial project-level set of possible values for a given WBS variable included in the initial project-level template that corresponds to the organization-level set of possible values for the given WBS variable included in the organization-level template. The second view of the second front-end module that may be presented to the client station may take various forms.

Figure 8A:
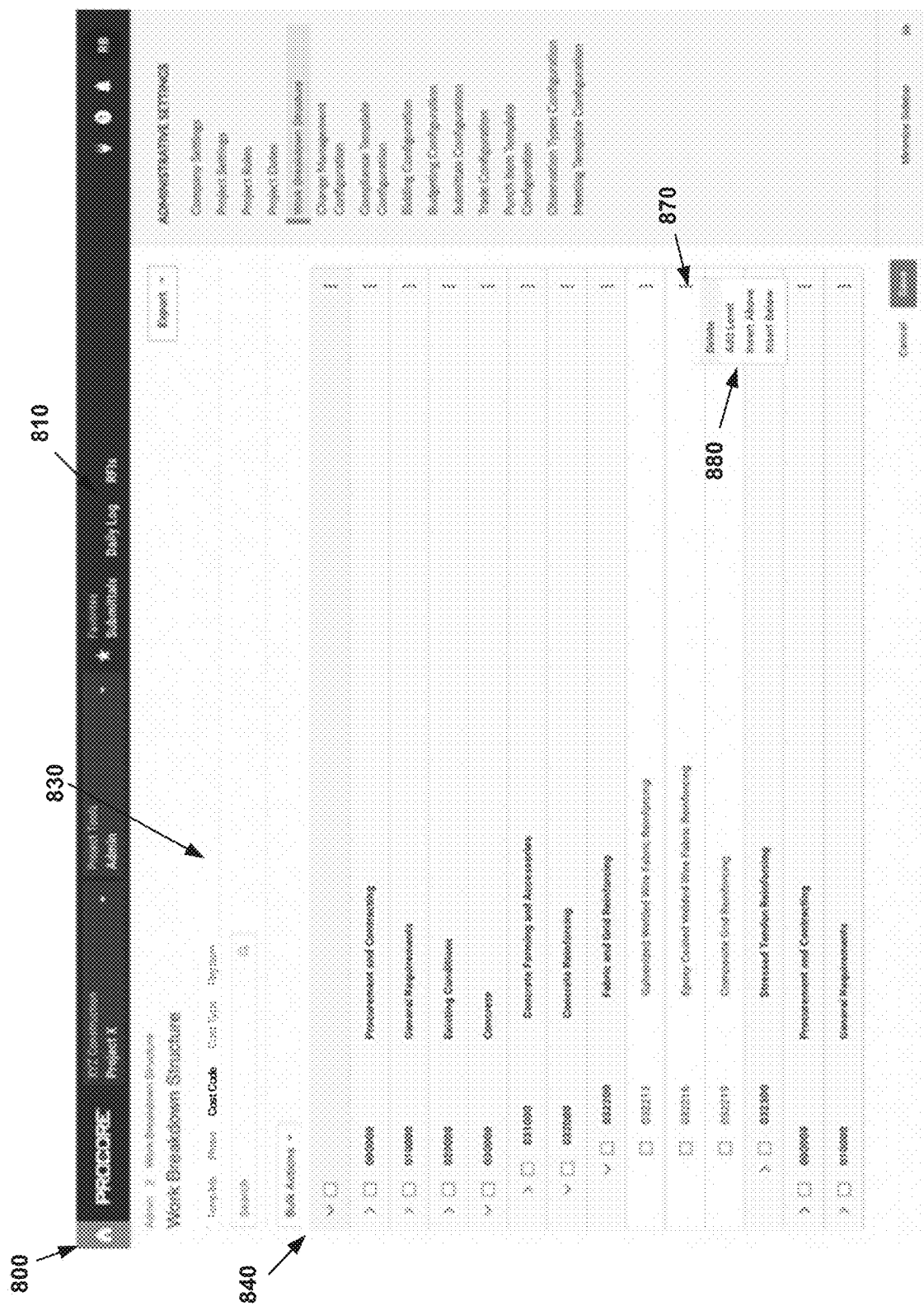
FIG. 8A depicts an example second view of a second front-end module that may be presented to a client station.

As one example to illustrate, FIG. 8A depicts an example view 800 that facilitates the modification of an initial project-level set of possible values for the "Cost Code" WBS variable that corresponds to the organization-level set of possible values for the "Cost Code" WBS variable in the organization-level template shown in FIG. 5B, which may be accessed after the second user inputs a selection of a tab that corresponds to the "Cost Code" WBS variable in tab region 730 of FIG. 7B. As shown, the tab that corresponds to the "Cost Code" WBS variable is bolded to provide an indication that view 800 of the second front-end module is being accessed to facilitate the modification of a project-level set of possible values for the "Cost Code" WBS variable. One of ordinary skill in the art will appreciate that view 800 may be accessed in various other manners as well.

As further shown in FIG. 8A, view 800 may include various elements, such as menu 810, value modification window 820, tab region 830, control button 870, and window 880, among other elements that are not numerically referenced. In general, these elements may take various forms similar to elements described above with respect to FIG. 5B. Further, one of ordinary skill in the art will appreciate that view 800 may include additional elements not shown and/or more or less of the depicted elements.

In practice, while accessing the second view of the second front-end software module, the user may input an indication that the user wishes to modify some aspect of the information in the second view of the second front-end software module, such as an indication to modify the initial project-level set of possible values presented in value modification window 820. The user may input this indication in various manners.

Figure 8B:
FIG. 8B depicts an example updated second view of the second front-end module.

As one possibility, as shown in FIG. 8A, the user may input an indication to select control button 870 which may cause the user's client station to present window 880 that may enable the user to remove a value from the initial project-level set of possible values presented in value modification window 820. To illustrate one particular example, FIG. 8B depicts an updated view 801 that shows how view 800 of FIG. 8A may be updated after the user inputs one or more indications in value modification window 820 to modify the initial project-level set of possible values for the "Cost Code" WBS variable. In general, FIG. 8B includes the project-level set of possible values for the "Cost Code" WBS variable that have been defined and a corresponding description for each possible value.

As another possibility, view 800 may include a "Control Button" (e.g., a "Bulk Actions" control button) to import the project-level set of possible values for a given WBS variable included in a project-level template that may have been created using another front-end module of the disclosed software application or a front-end module of a different software application. The imported project-level set of possible values may be presented in value modification window 520, and the user may input an indication to define a project-level set of possible values for a given WBS variable based on the imported set of possible values for the given WBS variable by using various elements in value modification window 820 described above.

As yet another possibility, back-end platform 102 may generate suggestions for the project-level set of possible values. For instance, when the second user sends a request to back-end platform 102 to access view 800 of the second front-end module, back-end platform 102 may generate suggestions for the project-level set of possible values corresponding to a given WBS variable included in the project-level template and present a recommended set of possible values for the given WBS variable in value modification window 820. The user may then input one or more indications to define a project-level set of possible values for the given WBS variable based on the recommended set of possible values for the given WBS variable by using various elements in value modification window 820 described above.

Back-end platform 102 may generate suggestions for the project-level set of possible values based on various information. As some examples, back-end platform 102 may generate suggestions for the project-level set of possible values based on an analysis of values that are being used for a given WBS variable on other projects being handled by the organization and/or values that are being used for a given WBS variable on other similar projects handled by other organizations of similar size, structure, industry, and expertise. In this respect, the recommended project-level set of possible values may represent a standard project-level set of possible values used for a given type of project. Back-end platform 102 may generate suggestions for the project-level set of possible values based on various other information as well.

Further, a user may input an indication to define the project-level set of possible values for a given WBS variable in various other manners as well.

In line with the discussion above, one of ordinary skill in the art will appreciate that the project-level set of possible values for a given WBS variable that are defined may be presented in value modification window 820 in various other manners as well, such as a list, outline, or the like, and each possible value in the set may take various other forms and may be represented in various other ways (e.g., in a hierarchical or non-hierarchical manner) as well.

At block 610, back-end platform 102 may receive data that defines the project-level set of possible values for a given WBS variable. For instance, after the second user inputs one or more indications to define the project-level set of possible values for a given WBS variable, the user's client station (e.g., client station 114) may send an indication of the user's input to back-end platform 102, and back-end platform 102 may receive this data. Back-end platform 102 may receive this data at various times.

For example, while accessing the second view of the second front-end module, the second user may input an indication to "save" the project-level set of possible values for a given WBS variable, which may be accomplished by selecting a "Save" control button in updated view 801, and back-end platform 102 may receive data that defines the project-level set of possible values for the given WBS variable each time the user inputs such an indication. Further, in line with the discussion above, one of ordinary skill in the art will appreciate that while the second user accesses the second view of the second front-end module, the user's client station (e.g., client station 114) and back-end platform 102 may communicate at various other times as well.

After back-end platform 102 receives data that defines the project-level set of possible values for a given WBS variable, back-end platform 102 may take one or more actions based on the received data. For example, back-end platform 102 may store the project-level set of possible values for a given WBS variable in a database (e.g., a database stored in data storage 204, or a database from an external data source) and/or generate an alert to notify another user that the project-level set of possible values for a given WBS variable has been defined. Back-end platform 102 may take one or more other actions as well.

Once a project-level set of customized, multi-dimensional WBS codes has been defined for a particular project, the second user may provision access to items associated with a given WBS code. For example, the second user may only allow certain users to view items associated with certain WBS codes.

Further, once a project-level set of customized, multi-dimensional WBS codes has been defined for a particular project, the disclosed process may transition from the second phase to the third phase, which generally involves using the project-level set of WBS codes to manage certain aspects of the particular project. For instance, as one possibility, the disclosed software application may enable an organization to use the project-level set of WBS codes to conduct financial planning for the particular project, which may involve assigning each WBS code in the project-level set (or at least a subset thereof) a respective budget amount for the particular project, coding actual expenditures on the particular project with the project-level set of WBS codes, and then tracking the budget for the particular project using the project-level set of WBS codes. These tasks—which may take various forms and be carried out in various manners— will now be described in further detail with reference to FIGS. 9-12.

Figure 9:
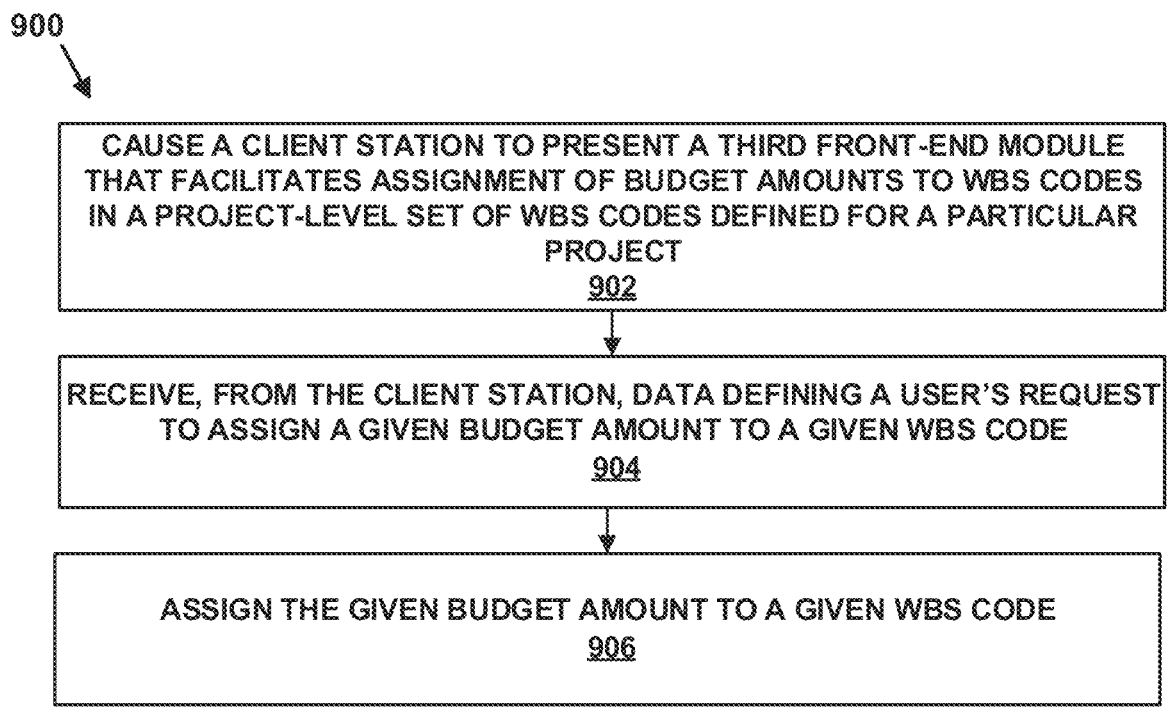
FIG. 9 depicts an example flow chart that may be carried out to facilitate the task of assigning budget amounts to a project-level set of WBS codes for a particular project.

For instance, FIG. 9 is a flow chart that depicts some example functions that may be carried out in order to facilitate the task of assigning budget amounts to a project-level set of WBS codes for a particular project. For the purposes of illustration only, the example functions are described as being carried out by a back-end platform (e.g., back-end platform 102). However, it is possible that the responsibility for carrying out the functions of the disclosed process could be distributed between a back-end platform (e.g., back-end platform 102) and one or more client stations (e.g., client stations 112, 114, and/or 116). Further, it should be understood that the flow diagram in FIG. 9 is merely described in such manner for the sake of clarity and explanation and that some functions may be carried out in various other manners as well, including the possibility that example functions may be added, removed, rearranged into different orders, grouped together, and/or not grouped together at all.

According to an example implementation, the task of assigning budget amounts to a project-level set of WBS codes for a particular project may begin with a third user having responsibility for financial planning on the particular project (e.g., project team member or the like) requesting access, via the third user's client station (e.g., client station 116), to a third front-end module of the disclosed software application that facilitates assignment of budget amounts to WBS codes in the project-level set of WBS codes defined for the particular project. The third user may request access to the third front-end module of the disclosed software application at various times and for various reasons, including for purposes of establishing the initial budget for the particular project.

In practice, the third user may request access to the third front-end module by launching a native application on the third user's client station or directing a web browser on the third user's client station to a URL for the disclosed software application, either of which may cause the third user's client station to send a request to back-end platform 102 to access the third front-end module of the disclosed software application.

At block 902, in response to receiving a request from the third user's client station to access the third front-end module of the disclosed software application, back-end platform 102 may cause the third user's client station to present the third front-end module of the disclosed software application that facilitates assignment of budget amounts to WBS codes in the defined project-level set of WBS codes for the particular project. The third front-end module that may be presented to the client station may take various forms.

Figure 10:
FIG. 10 depicts an example view of a third front-end module that may be presented to a client station.

As one example to illustrate, FIG. 10 depicts an example view 1000 that may be defined by the third front-end module of the disclosed software application and presented by the third user's client station. As shown, view 1000 may enable the third user to input budget amounts for different WBS codes in a project-level set of WBS codes that has been defined for a particular project referred to as "Project X." One of ordinary skill in the art will appreciate that view 1000 is merely illustrative, and that the view presented to the third user to facilitate assignment of budget amounts to WBS codes may take various other forms as well.

As further shown in FIG. 10, view 1000 may include various elements, such as menu 1010, window 1020, input region 1025, input region 1030, window 1040, and control button 1050, among other elements (e.g., tabs, control elements, etc.) that are not numerically referenced. In particular, the budget line items depicted in FIG. 10 may correspond to WBS codes to which the third user has been provisioned access. The third user may further filter the budget line items by selecting the filter button (not numbered), and may, for example, filter the view to display only line items corresponding to a specific subset of WBS codes. One of ordinary skill in the art will appreciate that view 1000 may include additional elements not shown and/or more or less of the depicted elements.

Menu 1010 may take various forms similar to menu 410 of FIG. 4A, such as a menu bar that is displayed horizontally across the top of view 1000 that includes an indication that a front-end module for "Project X" is being accessed. In line with the discussion above, menu 1010 may take various other forms as well.

Window 1020 may also take various forms. For instance, as shown in FIG. 10, window 1020 may take the form of a rectangular area that includes various elements that the user can interact with in order to input budget amounts for WBS codes (which may also be referred to as a "Budget Code"). For example, window 1020 may include an input region 1030 that enables the user to input a selection of a WBS code (referred to as a "Budget Code") that is to be assigned a budget amount and input region 1025 that enables the user to input a budget amount for a selected WBS code. In particular, interacting with input region 1030 may cause the user's client station to present window 1040 which may take the form of a pop-up window.

In practice, while accessing the third front-end software module, the third user may input an indication that the user wishes to create some aspect of the information presented via the third front-end software module, such as an indication to assign a budget amount to a given WBS code and add the given WBS code to a WBS of a specific project. The user may input this indication in various manners.

In one implementation, the third user may interact with window 1020 to request assignment of a given budget amount to a given WBS code in various manners. As one possibility, the third user may input a selection within input region 1030, which may cause the user's client station to present window 1040 in view 1000, where the user may then input a search term within window 1040 to search for a WBS code in the project-level set that is to be assigned a budget amount (e.g., a WBS code that has a description that includes the search term "Investigations") and may then input a selection of a particular WBS code that is to be assigned a budget amount (e.g., inputting a selection of the WBS code having a value of "0002.023113.S"). In turn, the user may input a budget amount for the selected WBS code in input region 1025 (and optionally input a description for the selected WBS code in the "Description" input region), and then select control button 1050 to request that a line item be added to reflect that the budget amount has been assigned to the selected WBS code for "Project X," which may in turn trigger the third user's client station to send data defining such a line item to back-end platform 102.

As another possibility, the user may input a selection within input region 1030, which may cause the user's client station to present a cursor within input region 1030, such that the user may then type a particular WBS code that is to be assigned a budget amount. In turn, the user may input a budget amount for the selected WBS code in input region 1025 (and optionally input a description for the selected WBS code in the "Description" input region), and then select control button 1050 to request that a line item be added to reflect that the budget amount has been assigned to the selected WBS code for "Project X," which may in turn trigger the third user's client station to send data defining such a line item to back-end platform 102.

As yet another possibility, the third user may input a selection within input region 1030, which may cause the user's client station to present a list of WBS codes for "Project X," and the user may then locate and select a particular WBS code that is to be assigned a budget amount from the list. In turn, the user may input a budget amount for the selected WBS code in input region 1025 (and optionally input a description for the selected WBS code in the "Description" input region), and then select control button 1050 to request that a line item be added to reflect that the budget amount has been assigned to the selected WBS code for "Project X," which may in turn trigger the third user's client station to send data defining such a line item to back-end platform 102.

The third user may interact with window 1020 to request assignment of a budget amount to a WBS code in various other manners as well.

In some implementations, view 1000 may also include a control button (not shown) for importing line items reflecting WBS codes that have previously been assigned budget amounts using the disclosed software application or another software application. A given WBS code that has been assigned a budget amount and has been imported may then be presented within window 1020, such as input region 1030, and the user may either accept the imported budget amount or modify the imported budget amount in input region 1025 before requesting that a line item be added to reflect the assignment of the budget amount to the selected WBS code for "Project X."

In still other implementations, it is possible that back-end platform 102 may present suggestions for a budget amount for a given WBS code. For instance, after selecting a WBS code that is to be assigned a budget amount (e.g., via input region 1030), back-end platform 102 may present suggestions for a budget amount for the selected WBS code in input region 1025, and the user may either accept the suggested budget amount or modify the suggested budget amount in input region 1025 before requesting that a line item be added to reflect the assignment of the budget amount to the selected WBS code for "Project X."

Back-end platform 102 may present suggestions for a budget amount for the selected WBS code based on various information. As some examples, back-end platform 102 may present suggestions for a budget amount for the selected WBS code based on an analysis of budget amounts that have been assigned to other WBS codes on the project, and/or budget amounts that have been assigned to WBS codes on other similar projects handled by the organization or other organizations of similar size, structure, industry, and expertise. Back-end platform 102 may present suggestions for a budget amount for the selected WBS code based on various other information as well.

Further, the third user may input a request to assign a given budget amount to a given WBS code in the project-level set of WBS codes for the particular project in various other manners as well.

At block 904, back-end platform 102 may receive data defining the third user's request to assign a given budget amount a given WBS code from the third user's client station (e.g., client station 116). Back-end platform 102 may receive this data at various times.

For example, while accessing the third front-end module, the third user may input an indication to add a line item, which may be accomplished by selecting control button 1050 in 1000, and back-end platform 102 may receive data requesting that a line item be added to reflect the assignment of the budget amount to a selected WBS code. One of ordinary skill in the art will appreciate that while the third user accesses the third front-end module, the user's client station and back-end platform 102 may communicate at various other times as well, such as each time the third user interacts with input region 1025 and/or input region 1030 or inputs an indication to save the assigned budget amount, which may be accomplished by selecting a save control button (not shown) in view 1000.

After back-end platform 102 receives data defining the third user's request to assign a given budget amount to a given WBS code from the third user's client station, back-end platform 102 may take one or more actions based on the received data. At block 906, for example, in response to the user's request, back-end platform 102 may assign the given budget amount to the given WBS code. Additionally, back-end platform 102 may cause the user's client station to present an indication that the given budget amount to the given WBS code has been assigned.

As another example, back-end platform 102 may store the budget amount assigned to the WBS code in a database (e.g., a database stored in data storage 204, or a database from an external data source), and/or generate an alert to notify another user (e.g., a project manager) involved with the particular project that a budget amount has been assigned to a WBS code in the project-level set of WBS codes defined for the particular project. Back-end platform 102 may take one or more other actions as well.

It should be understood that while the above examples pertain to assigning budget amounts to project-level set of WBS codes for a particular project, other examples are possible as well. For instance, the disclosed software application may be used to assign project-level documents, photos, submittals, RFIs, locations, or the like to project-level set of WBS codes for a particular project.

As the particular project progresses, the disclosed software application may also enable the actual expenditures associated with work on the particular project to be coded with the project-level set of WBS codes. Some example functions for facilitating this task of coding actual expenditures on the particular project with the project-level set of WBS codes will now be described in further detail with reference to FIG. 11.

Figure 11:
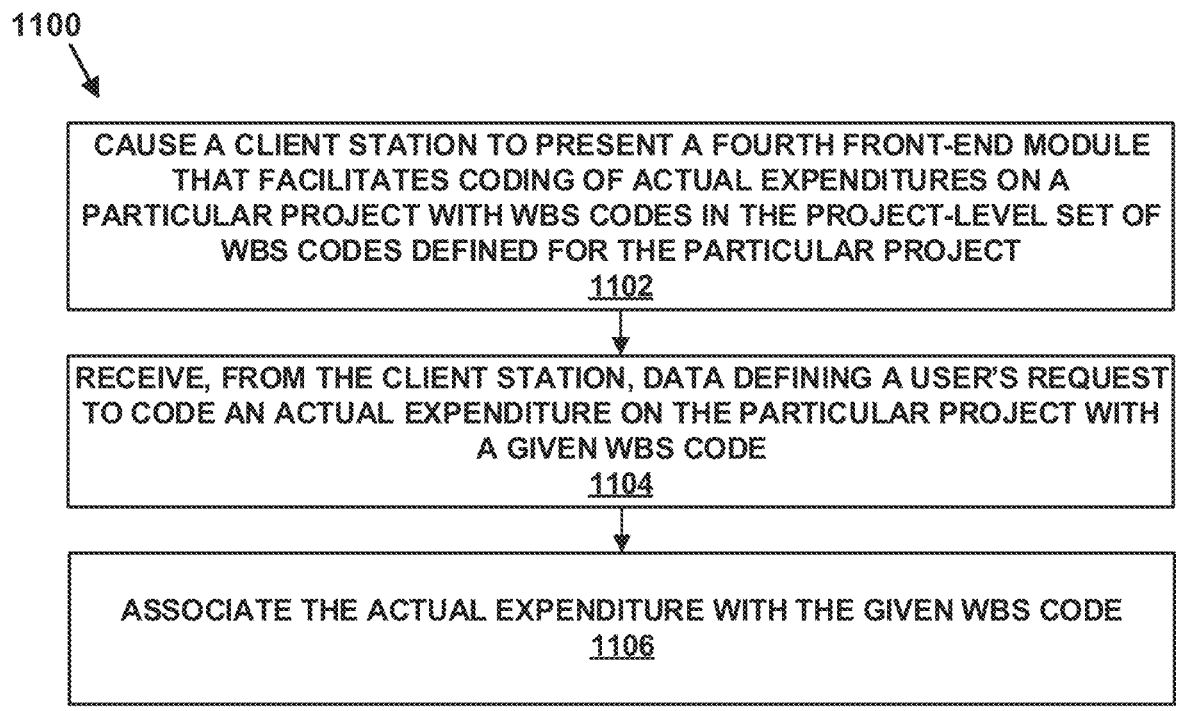
FIG. 11 depicts an example flow chart that may be carried out to facilitate the task of coding actual expenditures on a particular project with a project-level set of WBS codes.

For the purposes of illustration only, the example functions are described as being carried out by a back-end platform (e.g., back-end platform 102). However, it is possible that the responsibility for carrying out the functions of the disclosed process could be distributed between a back-end platform (e.g., back-end platform 102) and one or more client stations (e.g., client stations 112, 114, and/or 116). Further, it should be understood that the flow diagram in FIG. 11 is merely described in such manner for the sake of clarity and explanation and that some functions may be carried out in various other manners as well, including the possibility that example functions may be added, removed, rearranged into different orders, grouped together, and/or not grouped together at all.

According to an example implementation, the task of coding actual expenditures on the particular project with the project-level set of WBS codes may begin with a fourth user having responsibility for financial planning on the particular project (e.g., project team member or the like) requesting access, via the fourth user's client station, to a fourth front-end module of the disclosed software application that facilitates coding of actual expenditures on the particular project with WBS codes in the project-level set of WBS codes defined for the particular project. The fourth user may access the fourth front-end module of the disclosed software application at various times and for various reasons.

In practice, a fourth user may request access to the fourth front-end module by launching a native application on the fourth user's client station or directing a web browser on the fourth user's client station to a URL for the disclosed software application, either of which may cause the fourth user's client station to send a request to back-end platform 102 to access the third front-end module of the disclosed software application.

At block 1102, in response to receiving a request from the fourth user's client station to access the fourth front-end module of the disclosed software application, back-end platform 102 may cause the fourth user's client station to present the fourth front-end module of the disclosed software application that facilitates coding of actual expenditures on the particular project with WBS codes in the project-level set of WBS codes defined for the particular project. The fourth front-end module that may be presented to the client station may take various forms.

Figure 12:
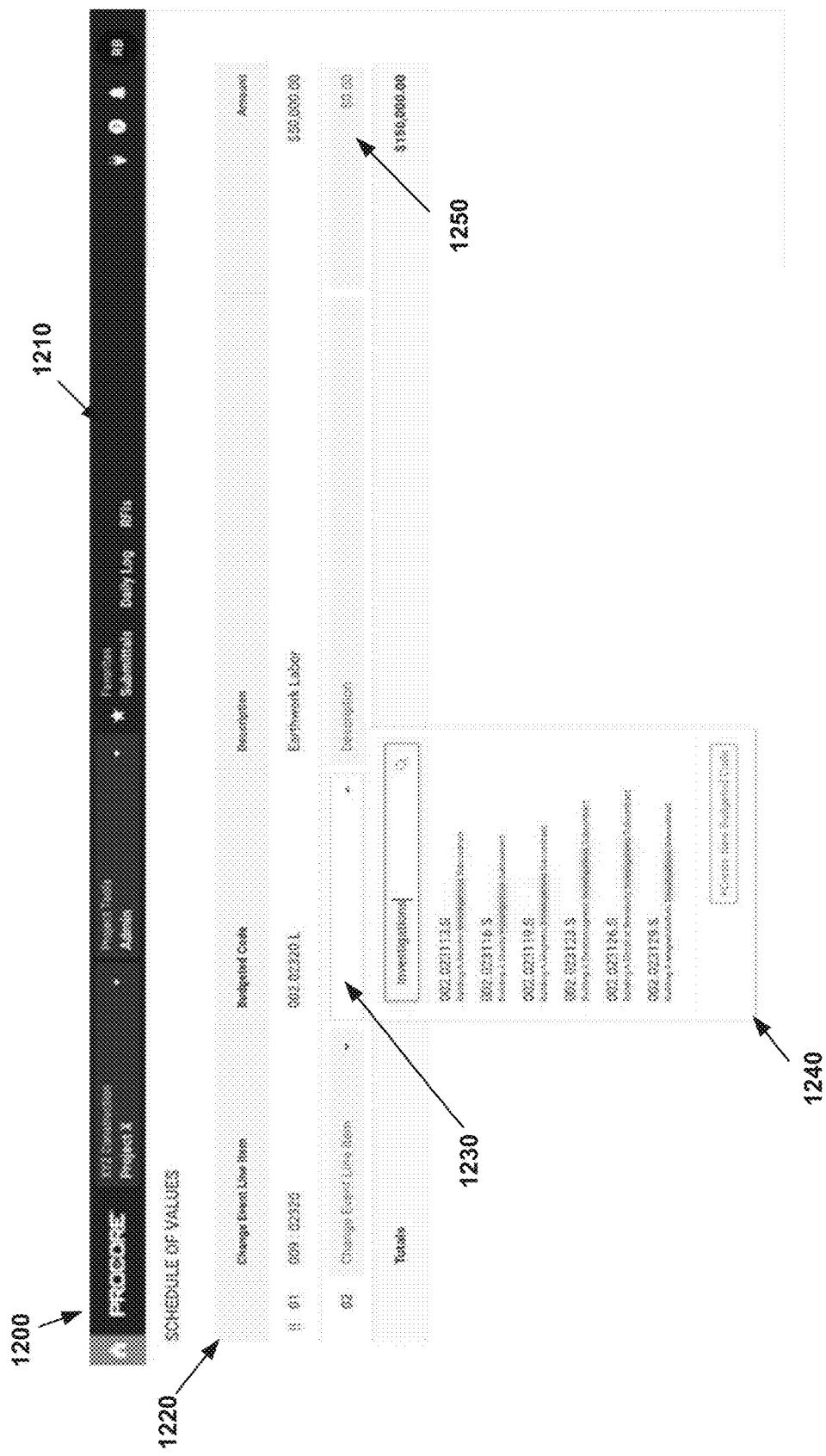
FIG. 12 depicts an example view of a fourth front-end module that may be presented to a client station.

As one example to illustrate, FIG. 12 depicts an example view 1200 that may be defined by the fourth front-end module of the disclosed software application and presented by the fourth user's client station. As shown, view 1200 may enable the fourth user to create a line item for an actual expenditure on a particular project referred to as "Project X" that is coded with a WBS code. One of ordinary skill in the art will appreciate that view 1200 is merely illustrative, and that this view presented to the fourth user may take various other forms as well.

As further shown in FIG. 12, view 1200 may include various elements, such as menu 1210, window 1220, input region 1230, window 1240, and input region 1250, among other elements (e.g., tabs, control elements, etc.) that are not numerically referenced. One of ordinary skill in the art will appreciate that view 1200 may include additional elements not shown and/or more or less of the depicted elements.

Menu 1210 may take various forms similar to menu 410 of FIG. 4A, such as a menu bar that is displayed horizontally across the top of view 1200 that includes an indication that a front-end module for "Project X" is being accessed. In line with the discussion above, menu 1210 may take various other forms as well.

Window 1220 may also take various forms. For instance, as shown in FIG. 12, window 1220 may take the form of a rectangular area that includes various elements that the user can interact with in order to create a line item for an actual expenditure on "Project X" that is coded with a WBS code. For example, window 1220 may include an input region 1230 that enables the user to input a selection of a Budget code and input region 1250 that enables the user to input an actual expenditure corresponding to a WBS code. In particular, interacting with input region 1230 may cause the user's client station to present window 1240 which may take the form of a pop-up window.

In practice, while accessing the fourth front-end software module, the fourth user may input an indication that the user wishes to create some aspect of the information presented via the fourth front-end software module, such as an indication to create a line item for an actual expenditure on "Project X" that is coded with a WBS code. The user may input this indication in various manners.

In one implementation, the fourth user may interact with window 1220 to request the creation of a line item for an actual expenditure that is coded with a WBS code. As one possibility, the fourth user may input a selection within input region 1230, which may cause the user's client station to present window 1240 in view 1200, where the user may then input a search term within window 1240 to search for a WBS code on "Project X" that is to be coded with an actual expenditure (e.g., a WBS code that has a description that includes the search term "Investigations") and may then input a selection of a particular WBS code that is to be coded with an actual expenditure (e.g., inputting a selection of the WBS code having a value of "0002.023113.S"). In turn, the user may input an actual expenditure for the selected WBS code in input region 1250 to request that a line item be created to reflect that the actual expenditure corresponding to the selected WBS code for "Project X," which may in turn trigger the fourth user's client station to send data defining such a line item to back-end platform 102.

As another possibility, the user may input a selection within input region 1230, which may cause the user's client station to present a cursor within input region 1230, such that the user may then type a particular WBS code that is to be coded with an actual expenditure. In turn, the user may input an actual expenditure for the selected WBS code in input region 1250 to request that a line item be created to reflect that the actual expenditure corresponding to the selected WBS code for "Project X," which may in turn trigger the fourth user's client station to send data defining such a line item to back-end platform 102.

As yet another possibility, the fourth user may input a selection within input region 1230, which may cause the user's client station to present a list of WBS codes on "Project X," and the user may then locate and select a particular WBS code that is to be coded with an actual expenditure. In turn, the user may input an actual expenditure for the selected WBS code in input region 1250 and then select control button 1050 to request that a line item be created to reflect that the actual expenditure corresponding to the selected WBS code for "Project X," which may in turn trigger the fourth user's client station to send data defining such a line item to back-end platform 102.

The fourth user may interact with window 1220 in various other manners as well.

In some implementations, view 1200 may also include a control button (not shown) for importing line items reflecting WBS codes that have previously been coded with actual expenditures using the disclosed software application or another software application. A given WBS code that has been imported may then be presented within window 1220, such as input region 1230, and the user may either accept the imported actual expenditure corresponding to the given WBS code or modify the imported actual expenditure in input region 1250 before requesting that a line item be created to reflect the actual expenditure corresponding to the given WBS code.

In still other implementations, it is possible that back-end platform 102 may present suggestions for an actual expenditure for a WBS code on a particular project. For instance, after selecting a WBS code that is to be coded with an actual expenditure (e.g., via input region 1230), back-end platform 102 may present suggestions for an actual expenditure for the selected WBS code in input region 1250, and the user may either accept the suggested amount or modify the suggested amount in input region 1250 before requesting that a line item be created to reflect the actual expenditure corresponding to the given WBS code.

The fourth user may input a request to create a line item for an actual expenditure that is coded with a WBS code in various other manners as well.

At block 1104, back-end platform 102 may receive data defining the fourth user's request to code an actual expenditure on the particular project with a given WBS code. Back-end platform 102 may receive this data from the fourth user's client station after the fourth user inputs the request to code an actual expenditure on the particular project with a given WBS code, or potentially at other times similar to the examples discussed above with respect to other modules of the disclosed software application.

At block 1106, after back-end platform 102 receives the data defining the fourth user's request to code the actual expenditure on the particular project with the given WBS code, back-end platform 102 may associate the amount of the actual expenditure with the given WBS code. Back-end platform 102 may associate the amount of the actual expenditure with the given WBS code in various manners.

As one particular example, a mapping table between WBS codes and line items created to reflect actual expenditures can be used to associate the amount of the actual expenditure with the given WBS code. Specifically, back-end platform 102 may store a table comprising WBS codes and a table comprising line items created to reflect actual expenditures may each be stored in a database (e.g., a database stored in data storage 204, or a database from an external data source), and back-end platform 102 may generate a mapping table that associates a given line item created to reflect an actual expenditure with a given WBS code. Back-end platform 102 may associate the amount of the actual expenditure with a given WBS code in various other manners as well.

Further, after back-end platform 102 receives the data defining the fourth user's request to code the actual expenditure on the particular project with the given WBS code, back-end platform 102 may take one or more other actions as well. For example, in line with the discussion above, back-end platform 102 may store data defining the association between the actual expenditure and the given WBS code in a database (e.g., a database stored in data storage 204, or a database from an external data source), and/or generate an alert to notify another user (e.g., a project manager) involved with the particular project that the actual expenditure has been coded with the given WBS code. Back-end platform 102 may take one or more other actions as well.

Once budget amounts have been assigned to the project-level set of WBS codes that have been defined for the particular project and actual expenditures on the particular project have been coded with the project-level set of WBS codes, the disclosed software application may then enable the organization to track the budget for the particular project using the project-level set of WBS codes. For instance, the disclosed software application may enable various reports (or the like) to be run that provide a comparison between the particular project's budget and the particular project's actual expenditures at various different levels of granularity. For example, one such report may provide a comparison between the particular project's budget and the particular project's actual expenditures that is broken down on a WBS code-by-code basis. As another example, another such report may provide a comparison between the particular project's budget and the particular project's actual expenditures that is broken down in one particular dimension (or WBS variable) of the project-level WBS, such as cost code, cost type, or the like. Other examples are possible as well.

In accordance with the present disclosure, one of ordinary skill in the art will appreciate that the project-level set of WBS codes defined for a specific project may be used to manage various other aspects of a project as well, which may depend on the particular project, the work to be performed on the particular project, and/or the manner in which a user interacts with the front-end modules of the disclosed software application.

Further, one of ordinary skill in the art will appreciate that any number of users may access a client station (e.g., client station 112, 114, or 116) to interact with the front-end modules of the disclosed software application, which may trigger back-end platform 102 to perform the functions described in FIGS. 3, 6, 9, and 11.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users" or other entities, this is for purposes of example and explanation only. Claims should not be construed as requiring action by such actors unless explicitly recited in claim language.

The invention claimed is:

1. A computing device comprising:
at least one processor;
a user interface;
at least one non-transitory computer-readable medium; and
program instructions stored on the at least one non-transitory computer-readable medium that are executable by the at least one processor such that the computing device is configured to:

receive, via the user interface, user input indicating a request for a first user to create, for a construction project, a new Work Breakdown Structure ("WBS") template to break down work for the construction project, wherein the new WBS template comprises two or more WBS segments arranged in a customized sequence and corresponding WBS values for each WBS segment;

based on data defining a master WBS template that indicates access permissions for users requesting to create new WBS templates based on the master WBS template, determine that the first user is authorized to create the new WBS template for the construction project using a set of WBS segments, wherein the access permissions indicate that the first user is (i) authorized to customize only a given subset of WBS segments, and (ii) restricted from customizing any other WBS segments in the set;

based on the determination and the master WBS template, generate an initial WBS template comprising (i) an initial sequence of concatenated WBS segments and (ii) for each WBS segment in the initial sequence, a respective initial set of possible values;

dynamically update the user interface to present a set of user interface views that enable the first user to modify the initial WBS template using only the given subset of WBS segments and thereby define the new WBS template;

receive data defining the new WBS template that indicates a respective set of access permissions for each segment included in the new WBS template, and one or more modifications to (i) the initial sequence of concatenated WBS segments in the initial WBS template or (ii) the respective initial set of possible values for a WBS segment specified in the initial sequence; and after receiving the data defining the new WBS template, (i) cause storage of the data defining the new WBS template, (ii) automatically impose restrictions on editing of the data defining the new WBS template, and (iii) based on respective sets of access permissions indicated by the data defining the new WBS template, dynamically update user interface views that enable other users to manage the construction project using the new WBS template.

2. The computing device of claim 1, further comprising program instructions stored on the at least one non-transitory computer-readable medium that are executable by the at least one processor such that the computing device is configured to:

receive, via the user interface, user input indicating a request for a second user to use the new WBS template to manage one or more aspects of the construction project;

determine that the second user is (i) authorized, based on the respective sets of access permissions indicated by the data defining the new WBS template, to use the new WBS template to manage the one or more aspects of the construction project but (ii) restricted, based on the respective sets of access permissions indicated by the data defining the new WBS template, from customizing any WBS segments; and dynamically update the user interface to present a second set of user interface views that enable the second user to use the set of WBS segments in the new WBS template to manage the one or more aspects of the construction project while restricting editing of any WBS segments in the new WBS template by the second user.

3. The computing device of claim 1, further comprising program instructions stored on the at least one non-transitory computer-readable medium that are executable by the at least one processor such that the computing device is configured to:
before receiving the request to create the new WBS template, receive a request for a third user to create the master WBS template, wherein the master WBS template is to be used as an initial template for new WBS templates;
determine that the third user is authorized to create the master WBS template;
based on determining that the third user is authorized to create the master WBS template, present a third set of user interface views that enable the third user to input the data defining the master WBS template, wherein the data defining the master WBS template comprises (i) a given sequence of two or more concatenated WBS segments, (ii) a respective, master-level set of possible segment values for each WBS segment specified in the master WBS template, and (iii) for each WBS segment specified in the master WBS template, a respective master-level set of access permissions that indicates whether or not the respective master-level set of possible segment values for a WBS segment specified in the master WBS template can be customized, and an indication of users who are authorized to customize the WBS segment specified in the master WBS template;
receive the data defining the master WBS template; and
after receiving the data defining the master WBS template, (i) cause storage of the data defining the master WBS template and (ii) automatically impose restrictions on editing of the data defining the master WBS template.

4. The computing device of claim 3, wherein the program instructions stored on the at least one non-transitory computer-readable medium that are executable by the at least one processor such that the computing device is configured to generate the initial WBS template for the construction project comprise program instructions that are executable by the at least one processor such that the computing device is configured to:
generate the initial WBS template for the construction project based on the data defining the master WBS template.

5. The computing device of claim 3, wherein the third user is the first user.

6. The computing device of claim 1, wherein the program instructions stored on the at least one non-transitory computer-readable medium that are executable by the at least one processor such that the computing device is configured to generate the initial WBS template for the construction project comprise program instructions that are executable by the at least one processor such that the computing device is configured to:
identify suggestions for the new WBS template based on (i) an analysis of WBS segments used for other projects associated with the first user, (ii) an analysis of WBS segments used for other projects similar to the construction project, or (iii) a standard WBS template used for a project type associated with the construction project.

7. The computing device of claim 6, further comprising program instructions stored on the at least one non-transitory computer-readable medium that are executable by the at least one processor such that the computing device is configured to:
present one or more recommended WBS templates based on the identified suggestions.

8. The computing device of claim 1, wherein the program instructions stored on the at least one non-transitory computer-readable medium that are executable by the at least one processor such that the computing device is configured to generate the initial WBS template for the construction project comprise program instructions that are executable by the at least one processor such that the computing device is configured to:
enable the first user to import a WBS template; and
generate the initial WBS template based on the imported WBS template.

9. The computing device of claim 1, wherein the two or more WBS segments comprise two or more of a project phase, a cost code, a cost type, a pay-item type, a revenue code, a bill code, or an owner billing group.

10. The computing device of claim 1, wherein the new WBS template comprises a respective delimiter in between each set of two consecutive WBS segments in the customized sequence.

11. The computing device of claim 1, wherein the one or more modifications comprise a modification to the initial WBS template that includes an addition of a given WBS segment to the initial WBS template.

12. Non-transitory computer-readable medium, wherein the non-transitory computer-readable medium is provisioned with program instructions that, when executed by at least one processor, cause a computing device to:
receive, via a user interface of the computing device, user input indicating a request for a first user to create, for a construction project, a new Work Breakdown Structure ("WBS") template to break down work for the construction project, wherein the new WBS template comprises two or more WBS segments arranged in a customized sequence and corresponding WBS values for each WBS segment;
based on data defining a master WBS template that indicates access permissions for users requesting to create new WBS templates based on the master WBS template, determine that the first user is authorized to create the new WBS template for the construction project using a set of WBS segments, wherein the access permissions indicate that the first user is (i) authorized to customize only a given subset of WBS segments, and (ii) restricted from customizing any other WBS segments in the set;
based on the determination and the master WBS template, generate an initial WBS template comprising (i) an initial sequence of concatenated WBS segments and (ii) for each WBS segment in the initial sequence, a respective initial set of possible values;
dynamically update the user interface to present a set of user interface views that enable the first user to modify the initial WBS template using only the given subset of WBS segments and thereby define the new WBS template;
receive data defining the new WBS template that indicates a respective set of access permissions for each segment included in the new WBS template, and one or more modifications to (i) the initial sequence of concatenated WBS segments in the initial WBS template or (ii) the respective initial set of possible values for a WBS segment specified in the initial sequence; and after receiving the data defining the new WBS template, (i) cause storage of the data defining the new WBS template, (ii) automatically impose restrictions on editing of the data defining the new WBS template, and (iii) based on the respective sets of access permissions indicated by the data defining the new WBS template, dynamically update user interface views that enable other users to manage the construction project using the new WBS template.

13. The non-transitory computer-readable medium of claim 12, wherein the non-transitory computer-readable medium is also provisioned with program instructions that, when executed by at least one processor, cause the computing device to:
receive, via the user interface, user input indicating a request for a second user to use the new WBS template to manage one or more aspects of the construction project;
determine that the second user is (i) authorized, based on the respective sets of access permissions indicated by the data defining the new WBS template, to use the new WBS template to manage the one or more aspects of the construction project but (ii) restricted, based on the respective sets of access permissions indicated by the data defining the new WBS template, from customizing any WBS segments; and
dynamically update the user interface to present a second set of user interface views that enable the second user to use the set of WBS segments in the new WBS template to manage the one or more aspects of the construction project while restricting editing of any WBS segments in the new WBS template by the second user.

14. The non-transitory computer-readable medium of claim 12, wherein the non-transitory computer-readable medium is also provisioned with program instructions that, when executed by the at least one processor, cause the computing device to:
before receiving the request to create the new WBS template, receive a request for a third user to create the master WBS template, wherein the master WBS template is to be used as an initial template for new WBS templates;
determine that the third user is authorized to create the master WBS template;
based on determining that the third user is authorized to create the master WBS template, present a third set of user interface views that enable the third user to input the data defining the master WBS template, wherein the data defining the master WBS template comprises (i) a given sequence of two or more concatenated WBS segments, (ii) a respective, master-level set of possible segment values for each WBS segment specified in the master WBS template, and (iii) for each WBS segment specified in the master WBS template, a respective master-level set of access permissions that indicates whether or not the respective master-level set of possible segment values for a WBS segment specified in the master WBS template can be customized, and an indication of users who are authorized to customize the WBS segment specified in the master WBS template;
receive the data defining the master WBS template; and
after receiving the data defining the master WBS template, (i) cause storage of the data defining the master WBS template and (ii) automatically impose restrictions on editing of the data defining the master WBS template.

15. The non-transitory computer-readable medium of claim 14, wherein the program instructions that, when executed by the at least one processor, cause the computing device to generate the initial WBS template for the construction project comprise program instructions that, when executed by the at least one processor, cause the computing device to:
generate the initial WBS template for the construction project based on the data defining the master WBS template.

16. The non-transitory computer-readable medium of claim 14, wherein the third user is the first user.

17. A method carried out by a computing device, the method comprising:
receiving, via a user interface of the computing device, user input indicating a request for a first user to create, for a construction project, a new Work Breakdown Structure ("WBS") template to break down work for the construction project, wherein the new WBS template comprises two or more WBS segments arranged in a customized sequence and corresponding WBS values for each WBS segment;
based on data defining a master WBS template that indicates access permissions for users requesting to create new WBS templates based on the master WBS template, determining that the first user is authorized to create the new WBS template for the construction project using a set of WBS segments, wherein the access permissions indicate that the first user is (i) authorized to customize only a given subset of WBS segments, and (ii) restricted from customizing any other WBS segments in the set;
based on the determination and the master WBS template, generating an initial WBS template comprising (i) an initial sequence of concatenated WBS segments and (ii) for each WBS segment in the initial sequence, a respective initial set of possible values;
dynamically updating the user interface of the computing device to present a set of user interface views that enable the first user to modify the initial WBS template and thereby define the new WBS template;
receiving data defining the new WBS template that indicates a respective set of access permissions for each segment included in the new WBS template, and one or more modifications to (i) the initial sequence of concatenated WBS segments in the initial WBS template or (ii) the respective initial set of possible values for a WBS segment specified in the initial sequence; and
after receiving the data defining the new WBS template, (i) causing storage of the data defining the new WBS template, (ii) automatically imposing restrictions on editing of the data defining the new WBS template, and (iii) based on respective sets of access permissions indicated by the data defining the new WBS template, dynamically updating user interface views that enable other users to manage the construction project using the new WBS template.

18. The method of claim 17, further comprising:
receiving, via the user interface, user input indicating a request for a second user to use the new WBS template to manage one or more aspects of the construction project;
determining that the second user is (i) authorized, based on the respective sets of access permissions indicated by the data defining the new WBS template, to use the new WBS template to manage the one or more aspects of the construction project but (ii) restricted, based on the respective sets of access permissions indicated by the data defining the new WBS template, from customizing any WBS segments; and dynamically updating the user interface to present a second set of user interface views that enable the second user to use the set of WBS segments in the new WBS template to manage the one or more aspects of the construction project while restricting editing of any WBS segments in the new WBS template by the second user.

19. The method of claim 17, further comprising:

before receiving the request to create the new WBS template, receiving a request for a third user to create the master WBS template, wherein the master WBS template is to be used as an initial template for new WBS templates;

determining that the third user is authorized to create the master WBS template;

based on determining that the third user is authorized to create the master WBS template, presenting a third set of user interface views that enable the third user to input the data defining the master WBS template, wherein the data defining the master WBS template comprises (i) a given sequence of two or more concatenated WBS segments, (ii) a respective, master-level set of possible segment values for each WBS segment specified in the master WBS template, and (iii) for each WBS segment specified in the master WBS template, a respective master-level set of access permissions that indicates whether or not the respective master-level set of possible segment values for a WBS segment specified in the master WBS template can be customized, and an indication of users who are authorized to customize the WBS segment specified in the master WBS template;

receiving the data defining the master WBS template; and after receiving the data defining the master WBS template, (i) causing storage of the data defining the master WBS template and (ii) automatically imposing restrictions on editing of the data defining the master WBS template.

20. The method of claim 19, wherein generating the initial WBS template for the construction project comprising:

generating the initial WBS template for the construction project based on the data defining the master WBS template.

* * * * *